US007815952B2

(12) United States Patent
Inoue et al.

(10) Patent No.: US 7,815,952 B2
(45) Date of Patent: Oct. 19, 2010

(54) PROCESS FOR PRODUCING FERMENTED BREADS COMPRISING RICE FLOUR AS THE MAIN COMPONENT

(75) Inventors: Susumu Inoue, Osaka (JP); Kanou Takeuchi, Okayama (JP)

(73) Assignee: Kabushiki Kaisha Hayashibara Seibutsu Kagaku Kenkyujo, Okayama (JP)

( * ) Notice: Subject to any disclaimer, the term of this patent is extended or adjusted under 35 U.S.C. 154(b) by 881 days.

(21) Appl. No.: 10/502,600

(22) PCT Filed: Jan. 31, 2003

(86) PCT No.: PCT/JP03/00990

§ 371 (c)(1),
(2), (4) Date: Jul. 27, 2004

(87) PCT Pub. No.: WO03/063596

PCT Pub. Date: Aug. 7, 2003

(65) Prior Publication Data

US 2005/0153015 A1  Jul. 14, 2005

(30) Foreign Application Priority Data

Feb. 1, 2002 (JP) ............... 2002-025299
Apr. 4, 2002 (JP) ............... 2002-102749

(51) Int. Cl.
*A21D 13/04* (2006.01)
(52) U.S. Cl. ............ 426/62; 426/496; 426/549
(58) Field of Classification Search .......... None
See application file for complete search history.

(56) References Cited

U.S. PATENT DOCUMENTS

| 4,560,559 A | 12/1985 | Ottenberg | |
| 5,049,398 A * | 9/1991 | Saari et al. ............ | 426/20 |
| 5,492,710 A | 2/1996 | Seyam | |
| 5,629,036 A * | 5/1997 | Yanetani et al. ............ | 426/19 |
| 6,039,997 A * | 3/2000 | Mizoguchi et al. .......... | 426/549 |
| 6,183,787 B1 * | 2/2001 | Ishigaki et al. .............. | 426/18 |
| 6,579,546 B1 * | 6/2003 | Jahnke .......................... | 426/19 |

FOREIGN PATENT DOCUMENTS

| EP | 983 727 A2 | 3/2000 |
| JP | 54-38185 B2 | 11/1979 |
| JP | 59-175845 A | 10/1984 |
| JP | 3-87135 A | 4/1991 |
| JP | 4-91744 A | 3/1992 |
| JP | 4-287652 A | 10/1992 |
| JP | 5-015298 A | 1/1993 |
| JP | 5-68468 A | 3/1993 |
| JP | 6-007071 A | 1/1994 |
| JP | 11-09174 A | 1/1999 |
| JP | 11-32706 A | 2/1999 |
| JP | 11-225661 A | 8/1999 |
| JP | 2000-175636 A | 6/2000 |
| JP | 2000-245332 A | 9/2000 |
| JP | 2001-123194 A | 5/2001 |
| JP | 2001-327242 A | 11/2001 |

OTHER PUBLICATIONS

Nishita et al., Development of a Yeast-leavended Rice-Bread Formula, Cereal Chemistry, 1976, pp. 626-635.*
Database WPI Section Ch, Week 200115 Derwent Publications Ltd., London, GB; AN 2001-142102 XP002311225 & JP 2000 333631 A (Nisshin Flour Milling Co) Dec. 5, 2000 abstract.
Patent Abstracts of Japan vol. 0174, No. 96 (c-1108), Sep. 8, 1993 & JP 5 130827 A (Noboru Otsuka) May 28, 1993 abstract.

* cited by examiner

*Primary Examiner*—Lien Tran
(74) *Attorney, Agent, or Firm*—Browdy and Neimark, PLLC

(57) ABSTRACT

A process is provided for producing bakery products using rice flour as a major ingredient, which products have improved qualities, such as appearance, crumb, taste, and shelf life as well as satisfactory handleability, as well as excellent qualities. Premixed flours containing rice flour, gluten and a saccharide such as an oligosaccharide or a sugar alcohol, are provided for making these bakery products. Fermented doughs for making the bakery products from the premix are also provided.

8 Claims, No Drawings

PROCESS FOR PRODUCING FERMENTED BREADS COMPRISING RICE FLOUR AS THE MAIN COMPONENT

TECHNICAL FIELD

The present invention relates to a process for producing fermented breads (hereinafter, called "bakery products" and "bakery products" means fermented bakery products in general including breads and buns, unless specified otherwise) using rice flour as a major material, particularly, to a process for producing bakery products, comprising a step of fermenting doughs which comprise rice flour as a major material, gluten, and a less-fermentable saccharide(s); bakery products obtainable by the process; and premixed flours and fermented doughs for producing the bakery products.

BACKGROUND ART

Usually, wheat flour and its mixture with rye flour are used as a major material in bakery products. Only wheat flour gives bakery products having a satisfactory bulge when used alone. It is known that "gluten", a gummy substance with a high viscosity and elasticity, is formed with gliadin and glutenin, both proteins presented in wheat, by adding water to wheat flour and kneading the resultant mixture. Gluten is known to have a function of embracing carbon dioxide, which is formed in dough by fermentation, and to increase the bulk of bakery products. Therefore, at present, wheat flours suitable for producing bakery products are selected by taking account of breed and producing-country of wheat because the applicability of wheat flours highly depends on the quantity and quality of proteins contained therein.

Most of the wheat used in Japan has been imported from abroad, while rice can be covered with domestic products and is the staple food for Japanese from a long time ago. Therefore, it would be meaningful to use rice for producing bakery products: There have been proposed methods which rice flour is used instead of wheat flour for producing bakery products. For example, processes for producing bakery products with the purpose of substituting some or large part of wheat flour with rice flour, are disclosed in Japanese Patent Kokai Nos. 15,298/93 and 225,661/99. In addition, processes for producing bakery products using rice flour alone are disclosed in Japanese Patent Kokai Nos. 7,071/94, 32,706/99, and 327,242/2001.

However, rice flours have different properties with those of wheat flours. Rice flour to be used for producing bakery products has been produced, usually, by using rice treated in such a manner prior to use as a material, and the resultant rice flour exhibits similar properties with wheat flour. There are several processes for treating rice: For example, a process comprising the steps of soaking rice in a solution comprising pectinase, dehydrating the soaked rice, milling the rice into a fine rice flour, drying the flour to give a moisture content of about 15%, and baking the resulting flour at about 150° C. as disclosed in Japanese Patent Kokai No. 287,652/92; a process comprising the steps of soaking a material rice in a solution comprising enzymes such as hemicellulase, pectinase, and pectin esterase, drying the rice, and milling the dried rice as disclosed in Japanese Patent Kokai No. 68,468/93; and a process comprising the steps of soaking rice in a solution comprising salts of organic acids or salts of organic acids and pectinase, dehydrating and drying the rice, and milling the resulting rice as disclosed in Japanese Patent Kokai No. 175,636/2000, have been proposed. Further, a process for producing bakery products using pre-fermented sponge prepared by admixing "ionized calcium" (monomolecular calcium) with rice flour comprising gluten has been disclosed in Japanese Patent Kokai No. 327,242/2001. However, the effect of "ionized calcium" has not yet been revealed in detail.

As disclosed in Japanese Patent Kokai Nos. 225,661/99 and 32,706/99, in the production of bakery products, it is generally known that a dough with a high rice flour content shows a relatively high adherability and unsatisfactory handleability and mechanical aptitude. It is also known that doughs and bakery products, prepared by using a powder comprising rice flour and gluten, show unsatisfactory characteristics of:

The above doughs are non-uniform and easily separated because of the poor binding of rice flour and gluten;
The preparation of dough is difficult; and
The above bakery products have a small bulk and unsatisfactory mouthfeel.

When tried to prepare bakery products using a material prepared by adding small amount of gluten to rice flour, the present inventors also found that the fermentation time of dough for fermentation step became short and this resulted in a reduction of working efficiency for producing bakery products in practical production. Also, the bakery products showed an unsatisfactory grain, small increase of bulks, and tough mouthfeel. Furthermore, the bakery products stiffened and did not rise because of insufficient evaporation of moisture during the baking and had no crust and poor appearance by white-tinged crust color. In addition, the resulting bakery products had several disadvantages of staling rapidly during preservation and stiffening easily.

The first object of the present invention is to provide a process for producing bakery products which have improved qualities in appearance, crumb, taste, preservability, etc., and have a satisfactory working efficiency for producing bakery products using dough prepared from rice flour as a major material as in the case of using dough prepared from wheat flour as a major material. The second object of the present invention is to provide bakery products, having satisfactory qualities, produced by the process. The third object of the present invention is to provide premixed flours for producing the bakery products. The fourth object of the present invention is to provide fermented doughs for producing the bakery products.

DISCLOSURE OF INVENTION

To solve the above objects, the present inventors have extensively studied from the viewpoint of saccharides, particularly, the fermentability of saccharides by yeast to improve qualities (appearance, crumb, taste, preservability, etc.) of bakery products without causing a bad influence on working efficiency for producing bakery products.

As a result, the present inventors newly found that the working efficiency for producing bakery products and qualities (appearance, crumb, taste, preservability, etc.) of conventional bakery products produced by using rice flour comprising gluten can be unexpectedly and vastly improved by incorporating prescribed amounts of gluten and a less-fermentable saccharide(s) into rice flour, more particularly, incorporating a prescribed amount of a saccharide(s), selected from the group consisting of oligosaccharides and sugar alcohols as the less-fermentable saccharides into rice flour. The present inventors accomplished the present invention by establishing a novel process for producing bakery products and providing bakery products having satisfactory qualities (appearance, crumb, taste, preservability, etc.), obtainable by the process, premixed flours suitable for producing the bakery products, and fermented dough suitable for producing the bakery products.

The present invention solves the above objects by providing:

A process for producing bakery products, which has a step of fermenting dough comprising mainly rice flour, and incorporating gluten and a less-fermentable saccharide(s) into rice flour, preferably, incorporating to rice flour gluten and 6 w/w % (hereinafter, "w/w %" is abbreviated as "%", unless specified otherwise in the present specification) or higher but 20% or lower, on a dry solid basis (hereinafter, abbreviated to "d.s.b.", unless specified otherwise), of a less-fermentable saccharide(s) selected from oligosaccharides and sugar alcohols;

Bakery products obtainable by the process;

Premixed flours for producing the bakery products, which comprise rice flour and gluten, where a less-fermentable saccharide(s), preferably, 6% or higher but 20% or lower, d.s.b., of a less-fermentable saccharide(s) selected from the group consisting of oligosaccharides and sugar alcohols is incorporated into the rice flour; and Fermented doughs for producing the bakery products, where gluten and a less-fermentable saccharide(s) are incorporated into rice flour.

BEST MODE FOR CARRYING OUT THE INVENTION

Rice flour is usually produced from raw rice grain of non-glutinous rice or glutinous rice by milling and pulverizing. Several kinds of rice flour are commercialized as "joshinko (a rice flour milled by roll-method)", "joyoko (a rice flour milled by stump-meal-method)", "mochiko (a glutinous rice flour)", "shiratamako (a rice flour milled by wet-meal method)", "genmaiko (an unpolished rice flour)", and the like, which are used for producing "dango (rice dumpling)", "senbei (Japanese rice cracker)", "mochigashi (bean-jam cake)", and the like. The above rice flour, commercialized conventionally, can be used as major materials for the bakery products of the present invention. Rice flour, obtainable by crushing or milling rice (polished rice, unpolished rice, rice screening, stale rice, etc.) with various conventional flour milling methods, for example, stump-meal-method, roll-method, impact crushing-method, can be advantageously used. Optionally, fine rice flour, obtainable by milling and/or sifting the above rice flours, can be advantageously used. A desirable particle size of rice four is 300 µm or lower, desirably, 75 µm or lower, more desirably, 45 µm or lower as an average particle diameter. The rice flour usable in the present invention is not restricted to whether the origin is non-glutinous rice or glutinous rice. Both raw rice flour and pre-gelatinized rice flour can be advantageously used in the present invention. In combination with the rice flours described above, "shironuka (polished white rice ground)", a by-product obtainable by polishing white rice for brewing, can be advantageously used together.

Vital gluten is desirably used as gluten. Rice flours can be used as a major material of bakery products by incorporating gluten in an amount of about 5-30%, desirably, about 10-25% into rice flour. When processed into a dough for bakery products using gluten in an amount of less than 5% to rice flour, the resulting dough does not become glutinous, easily loses carbon dioxide formed by fermentation, and shows an unsatisfactory bulge. The bakery products thus obtained show a small increase of bulk and have tough mouthfeel. In the case of using a dough comprising gluten in an amount of higher than 30% to rice flour, the dough is too tough, shows a large adherability, and has unsatisfactory handleability and mechanical aptitude on preparing dough for bakery products. The dough shows a small increase of bulk, and the resulting bakery products after baking show a non-uniform crumb and coarse texture. Optionally, wheat flour in an amount of less than equal amount, desirably, 20-40% to rice flour can be advantageously admixed with rice flour to increase the amount of gluten in the dough or to save gluten to be additionally added.

As regards the amount of water admixed with rice flour for producing bakery products of the present invention, since the quality of starch of rice flour is different from that of wheat flour, doughs prepared by using the same amount of water as in the case of wheat flour show, generally, a high viscosity and adherability, and unsatisfactory working efficiency and mechanical aptitude. In the case of bakery products prepared with rice flour as a major material, the desirable amount of water is in the range of 85-115%, particularly, 92-107% to rice flour. Doughs prepared by adding water in an amount of less than 85% to rice flour show a high adherability because of the high viscosity, and an unsatisfactory handleability and mechanical aptitude. While, doughs prepared by adding water in an amount of more than 115% to rice flour become the so-called "mizudane", doughs having a fluidity because of the excessive moisture, and show an unsatisfactory shape. Therefore, bakery products having a satisfactory bulge and quality can not be obtained. As regards the timing of adding water to flour, water can be added to rice flour, a major material, and gluten before adding side materials for kneading, or to the mixture of all materials. It is desirable to add water with dividing into several portions and observing the condition of dough. Also, a prescribed amount of water can be added to a premixed flour, a mixture of all materials except for water. In the case of using side materials including a large amount of moisture, for example, milk, whole egg, etc., it is necessary, in the present invention, to take into account the amount of water contained in them.

In order to produce bakery products having a satisfactory bulge, the use of easily-fermentable saccharides, which are fermented and utilized to produce carbon dioxide and ethanol by baker's yeast, are essential. Glucose, fructose, isomerized-sugar, honey, sucrose, etc. can be used as the easily-fermentable saccharides. However, in the case of producing bakery products using rice flour as a major material, the use of easily-fermentable saccharides only deteriorates working efficiency because it shortens fermentation time in practical production, and the production of bakery products having satisfactory qualities (appearance, crumb, taste, preservability, etc.) is difficult. The present invention improves the working efficiency and qualities of bakery products by incorporating a less-fermentable saccharide(s) (hereinafter, designated as "less-fermentable saccharide", unless specified otherwise) into doughs along with easily-fermentable saccharides to control fermenting speed and to prolong and regulate the fermentation time. The less-fermentable saccharide used in the present invention are saccharides, which are not fermented easily by baker's yeast, and most of them are remained intact in fermented doughs prepared after fermenting and utilizing easily-fermentable saccharides. Various oligosaccharides and sugar alcohols can be used as the less-fermentable saccharide. Origins of oligosaccharides and sugar alcohols are not restricted. The less-fermentable saccharide usable in the present invention includes, for example, malto-oligosaccharides such as maltose, maltotriose, maltotetraose, maltopentaose, and maltohexaose, obtainable by saccharifying starch enzymatically, isomalto-oligosaccharides such as isomaltose, isomaltotriose, and panose, koji-oligosaccharides such as kojibiose and kojitriose, nigero-oligosaccharides obtainable by hydrolyzing nigeran or saccharifying starch enzymatically, lactose, galacto-oligosaccharides obtainable by converting lactose enzymatically, lactulose obtainable by isomerizing lactose, xylo-oligosaccharides obtainable by hydrolyzing hemicellulose comprised in heart of corn, palatinose and trehalulose, obtainable by converting sucrose emzymatically, gentio-oligosaccharides obtainable by condensing glucose enzymatically, manno-oligosaccharides obtainable by hydrolyzing mannan, cello-oligosaccharides obtainable by hydrolyzing cellulose, laminarino-oligosaccharides obtainable by hydrolyzing a polysaccharide, laminarin, and various reducing oligosaccharides comprising mixture thereof can be arbitrarily used. Commercially available oligosaccharide products such as purified maltose, maltitol, syrup of malto-oligosaccharides, and syrup of isomalto-oligosaccharides can be arbitrarily used. For example, "SUNMALT®", purified maltose, "TETRUP®" and "PENTRUP®", syrups of malto-oligosaccharide, "PANORUP®" and "ISOMALT 900", syrups of iso-malto-oligosaccharide, which are all commercialized by Hayashibara Shoji Inc., Okayama, Japan, can be advantageously used. Also, non-reducing oligosaccharides, composed of only glucose molecules, for example, α,α-trehalose produced from starch by enzymatic saccharification, neotrehalose, saccharide-derivatives of α,α-trehalose such as glucosyl α,α-trehalose, maltosyl α,α-trehalose, maltotriosyl α,α-trehalose, α-maltosyl α-maltoside, α-isomaltosyl α-maltoside, α-maltotriosyl α-maltoside, and α-panosyl α-maltoside, and cyclotetrasaccharide having a structure of cyclo{→6}-α-D-glucopyranosyl-(1→3)-α-D-glucopyranosyl-(1→6)-α-D-glucopyranosyl-(1→3)-α-D-glucopyranosyl-(1→}, can be advantageously used. Further, saccharide-derivatives of cyclotetrasaccharide such as glucosyl cyclotetrasaccharide and galactosyl cyclotetrasaccharide can be advantageously used. Also, non-reducing oligosaccharides having a fructoside bond such as "NYUKA-OLIGO®" (lactosucrose), a lactose-fructose oligosaccharide commercilized by Hayashibara Shoji Inc., Okayama, Japan, obtainable by enzymatic conversion using lactose and sucrose as materials, soybean-oligosaccharide obtainable by purifying soybean whey, and raffinose obtainable by purifying beet syrup can be used. However, non-reducing oligosaccharide having a fructoside bond is easily fermented and utilized by baker's yeast because the fructoside bond is easily hydrolyzed. Therefore, considering the amount of the saccharides remaining in the resulting bakery products, it is necessary to use great amount of the saccharides. Further, mixtures of two or more of the above oligosaccharides can be advantageously used.

As the less-fermentable saccharide usable in the present invention, sugar alcohols, for example, monosaccharide alcohols, obtainable by reducing monosaccharides, such as sorbitol, dulcitol (galactitol), xylitol, and mannitol, erythritol obtainable by fermenting glucose by yeast, various malto-oligosaccharide alcohols such as maltitol, maltotriitol, and the like, reduced-syrup obtainable by reducing oligosaccharides, obtained by saccharifying starch enzymatically, isomalto-oligosaccharide alcohols such as isomaltitol, isomaltotriitol, and the like, lactitol obtainable by reducing lactose, reduced-palatinose obtainable by reducing palatinose, and various sugar alcohols comprising mixtures thereof can be arbitrarily used. Origins of the sugar alcohols are not restricted, and various commercially available sugar alcohol products such as maltitol, reduced-syrup, and the like can be used. For example, "MABIT®", a maltitol product commercialized by Hayashibara Shoji Inc., Okayama, Japan, "HS-30", a reduced-syrup commercialized by Hayashibara Shoji Inc., Okayama, Japan, and "PALATINIT", a reduced palatinose product syrup commercialized by Shin Mitsui Sugar Co., Ltd., Tokyo, Japan, can be advantageously used. Mixtures of two or more of the above sugar alcohols and mixtures of two or more oligosaccharides described above and sugar alcohols can be advantageously used.

Generally, doughs prepared by using rice flour as a major material and gluten is remarkably fermented by yeast at "floor time" (primary fermentation) and scarcely fermented at "proofing time" (secondary fermentation). Therefore, the crumb of resulting bakery products is coarse and heterogeneous in texture, and the taste of the bakery products, just after baking, is deteriorated rapidly. In contrast, in the case of doughs prepared by incorporating less-fermentable saccharides, particularly, saccharides selected from the group consisting of less-fermentable oligosaccharides and less-fermentable sugar alcohols along with rice flour and gluten, most of less-fermentable saccharide remains even after baking, whereas less-fermentable saccharide is partly consumed by fermentation. Therefore, the preservability of the resulting bakery products is improved by the suppression of the stiffening. In addition, the bakery products have a fine sweetness of less-fermentable saccharide, preferably, less-fermentable oligosaccharides and sugar alcohols, and keep high qualities of appearance, crumb, and taste. Further, since the bakery products of the present invention have a high moisture content and moisture retaining ability, they do not substantially absorb moisture. Accordingly, in the case of reheating by a microwave oven or oven and processing the bakery products to cooked bakery products such as sandwiches and hot dogs, the bakery products of the present invention keep a satisfactory quality and hardly make you feel thirsty when tasted. In the case of thawing the doughs frozen after "bench time", since survival and regeneration rate of yeast for fermentation are increased by incorporating less-fermentable saccharide, preferably, saccharide selected form the group consisting of less-fermentable saccharides and sugar alcohols, the dough is actively fermented. Also, since the denaturation of starch and proteins of the doughs is decreased, there is no difference between doughs frozen and not frozen. Therefore, the frozen dough is also suitable as fermented doughs for producing bakery products, and can be made into high-quality bakery products.

Preferable amount of less-fermentable saccharides, particularly, saccharides selected from the group consisting of oligosaccharides and sugar alcohols, to rice flour is in the range of 6% or higher but 20% or lower, desirably, 8% or higher but 20% or lower, d.s.b. In the case of using less-fermentable saccharide in an amount of less than 6%, the resulting dough is fermented too fast and shows unsatisfactory bulge and gives working efficiency, and the resulting bakery products show a small increase of bulk and an unsatisfactory preservability because of the fast stiffening. In the case of using less-fermentable saccharide in an amount of higher than 20%, operation time for producing bakery products is prolonged and working efficiency is deteriorated. In the fermentation processes, "floor time (primary fermentation)" and "proofing time (secondary fermentation)" are desirably set to 30 minutes or longer from the viewpoint of working efficiency. Also, if doughs having a satisfactory fermentation state can be obtained, time for the processes can be more shortened. In the case of using dough prepared from rice flour as a major material, high quality bakery products having a satisfactory appearance, crumb, and taste can be obtained within a total fermentation time, including "bench time (aging)" of 15 minutes, of 106-233 minutes. It is desirable to prepare the dough with a total fermentation time including "bench time" of about 120 minutes. Proofing can be done at ambient temperature as similarly in the case of "floor time" without using a proofing room. Although less-fermentable saccharide, preferably, saccharides selected from less-fermentable oligosaccharides and sugar alcohols, are usually admixed with doughs when the doughs are prepared by admixing water to materials, the saccharides can be admixed at anytime before fermentation. Less-fermentable saccharides can be advantageously admixed in advance with rice flour or gluten. Optionally, the saccharide can be advantageously admixed with all the materials used except for water to produce premixed flours.

In the present invention, it is desirable to use α,α-trehalose as less-fermentable saccharide described above because α,α-trehalose has excellent functions of controlling fermentation speed, regulating fermentation time, inhibiting the stiffening and improving the preservability by preventing the retrogradation of starch contained in gelatinized rice flour, and suppressing the deterioration of lipids contained in rice flour; and has a good taste. The present inventors disclosed in Japanese Patent Kokai No. 123,194/2001 that a high quality polished rice and non-washing rice, which both suppressed the generation of so-called "smell of rice bran", can be produced by incorporating α,α-trehalose and/or maltitol into unpolished rice on the production of polished rice and non-washing rice because the saccharides suppress the formation of volatile aldehydes from fatty acids contained in bran and germ and the degradation of fatty acids. The use of α,α-trehalose and/or maltitol in the present invention preferably suppresses the generation of the smells of rice bran and sweaty gelatinized rice, originated from rice flour and that originated from gluten. However, it is not always preferable to use α,α-trehalose only as a less-fermentable saccharide in an amount of 6% or higher, d.s.b., to rice flour to give a satisfactory appearance and taste to baked-bakery products. Usually, it is preferable to use α,α-trehalose along with other less-fermentable saccharide. In the case of using α,α-trehalose along with other less-fermentable saccharide, it is preferable to use α,α-trehalose with the amount of lower than 6%, d.s.b., to rice flour along with one or more saccharides selected from the group consisting of other oligosaccharides and sugar alcohols to give a total amount of, usually, 6% or higher but 20% or lower, desirably, 8% or higher but 20% or lower, to rice flour.

α,α-Trehalose is a non-reducing stable saccharide which two glucose molecules are bound via α,α-1,1-linkage. Origin of α,α-trehalose used in the present invention is not restricted. α,α-Trehalose from various origins, for example, those which are obtainable by extracting from yeast cells, obtainable from maltose by phosphorylase-method, and obtainable by saccharifying starch enzymatically, can be arbitrary selected. Commercially available high purity hydrous crystalline α,α-trehalose and high purity anhydrous crystalline α,α-trehalose can be also used. For example, "TREHA®", high purity hydrous crystalline α,α-trehalose commercialized by Hayashibara Shoji Inc., Okayama, Japan, can be advantageously used.

As described above, the amount of less-fermentable saccharide to rice flour in the present invention is preferably in the range of 6% or higher but 20% or lower, desirably, 8% or higher but 20% or lower, d.s.b. In order to save the amount of less-fermentable saccharide, a method incorporating a less-fermentable saccharide to a dough by admixing starch-saccharifying enzymes such as β-amylase and α-amylase with a part or the whole of pre-gelatinized rice flour or a mixture of rice flour and gelatinized starch prepared separately to form the above less-fermentable saccharide, for example, malto-oligosaccharides such as maltose and maltotetraose, can be advantageously used. To attain the object, it is desirable to form the desired less-fermentable saccharide during the fermentation of dough and to control the total amount of less-fermentable saccharide to be added separately and formed newly to a level of 6% or higher but 20% or lower to rice flour. Although the amount of gelatinized starch depends on the amount of less-fermentable saccharide incorporated into rice flour in advance, it is, usually, preferable to use gelatinized starch in the range of 1% or higher but 25% or lower, desirably, 2% or higher but 20% or lower. Although the amount of starch-saccharifying enzyme depends on the amount of gelatinized starch to rice flour, conditions of enzymatic reaction such as fermentation temperature, pH, time, etc., the enzyme is preferably used in an amount of, usually, five units or higher but 1,000 units or lower, desirably, 10 units or higher but 500 units or lower per gram of gelatinized starch, d.s.b., in terms of its saccharifying activity. In the case of using the saccharifying activity of lower than five units per one gram of gelatinized starch, d.s.b., as the amount of starch-saccharifying enzyme, the amount of formed less-fermentable saccharide is small even in the case of using a large amount of gelatinized starch and the effect of saving is not obtained. In the case of using the saccharifying activity of higher than 1,000 units, the total amount of less-fermentable saccharide may be exceeded 20% depending on the amount of gelatinized starch because a most of gelatinized starch is converted to less-fermentable saccharide. Therefor, it is concerned that an excess amount of less-fermentable saccharide causes the disadvantage of making the fermentation time to be longer. Saccharifying activity of starch-saccharifying enzyme can be measured using the following method. One unit of the enzyme activity is defined as the amount of enzyme which forms a reducing power corresponding to one μmole of glucose per minute under the conditions of 40° C. and pH 6.0 for one hour using 1% soluble starch solution as a substrate. Origin of the gelatinized starch usable in the present invention is not restricted. Gelatinized starch obtained by gelatinizing material rice flour in advance and commercially available gelatinized starch, for example, "mijinko" originated from non-glutinous rice, and "jonanko" and "kanbaiko" both originated from glutinous rice, can be advantageously used. Also, origin of starch-saccharifying enzyme is not restricted as far as giving the objective effect. Specially prepared enzymes and commercially available various starch-saccharifying enzymes can be used. For example, "MOCHI-SOFT", an enzyme preparation prepared by mixing saccharifying amylase and β-amylase commercialized by Sankyo Foods Co., Ltd., Tokyo, Japan, and "MOCHI BEST SUPER", a β-amylase preparation commercialized by Riken Vitamin Co., Ltd., Tokyo, Japan, can be advantageously used. In the case of preparing β-amylase preparation or α-amylase preparation separately, non-reducing saccharides such as α,α-trehalose and sugar alcohol such as maltitol are preferably used as base materials rather than reducing malto-oligosaccharides such as maltose to avoid the product-inhibition of β-amylase and α-amylase.

Optionally, water-soluble polysaccharides can be used in addition to less-fermentable saccharide described above. One or more polysaccharides or derivatives thereof, showing affinities and satisfactory compatibilities with rice flour; gluten, easily-fermentable saccharide; and less-fermentable saccharide in the presence of moisture, are suitable as water-soluble polysaccharides. For example, polysaccharides originated from microorganisms such as pullulan, xthantan gum and the like, those originated from seaweeds such as alginic acid, carrageenan, and the like, water-soluble polysaccharides and derivatives thereof originated from higher plant such as tara gum, tamarind gum, locust bean gum, gum arabic, pectin, inulin, mucilage of Chinese yam, mucilage of purple-wan dock shield, and the like, can be arbitrary used. In addition to the derivatives described above, water-soluble chemically modified substances and water-soluble partial hydrolyzates of inherently water-insoluble or hardly water-soluble polysaccharides such as cellulose, starch, and the like can be advantageously used. For example, caboxymethyl cellulose-sodium salt, hydroxyethyl-starch, dextrin and the like can be advantageously used.

In the case of using a relatively low amount of less-fermentable saccharide, changing in shape and puckering of doughs, caused by the dissociation of rice flour and gluten, can be suppressed by adding water-soluble polysaccharides to the doughs to improve the association of them. In the case of using a relatively low amount of less-fermentable saccharide of less than 8% to rice flour, the use of water-soluble polysaccharide lower than 5% easily causes the dissociation of rice flour and gluten, and gives bakery products having a small increase of bulk and unsatisfactory mouthfeel resulted from varying the texture and coarse crumb after baking. On the other hand, the use of a water-soluble polysaccharide(s) of higher than 5% causes the deterioration of handleability and mechanical aptitude resulted from high viscosity of dough, and gives dough having small increase of bulk after fermentation and bakery products having a non-uniform and rough texture after baking. Accordingly, in the case of using a relatively low amount of less-fermentable saccharide of lower than 8%, the amount of water-soluble polysaccharide is preferable to be in the range of 0.5% or higher but 5% or lower to rice flour. The timing to adding the water-soluble polysaccharide(s) to the dough can be arbitrarily controlled. Usually, the water-soluble polysaccharide(s) is added to the materials when dough is prepared. Optionally, premixed flours prepared by admixing water-soluble polysaccharide with rice flour, gluten, and less-fermentable saccharide can be advantageously used.

Various foods and food ingredients, for example, seasonings such as sodium chloride, fat, powderized fat, and the like, protein materials such as milk, skim milk, egg, soybean protein, and the like, nutrient materials such as vitamin, mineral, and the like, preservatives such as organic acid and/or salts thereof, ethanol, and the like, can be arbitrary added to the doughs and premixed flours for producing bakery products of the present invention. Further, it is preferable to incorporate a suitable amount of crack, grits, or flour of grains such as rice, wheat, rye, adlay, corn, millet, barnyard millet, soybean, and the like, of chop, chip, powder of or starch originated from sweet potato, potato, Chinese yam, taro, and the like, and whole-, milled-, processed- or cooked-fruits, seeds, roots, foliages of plants such as fruit plants, root vegetables, leaf vegetables, spices, herbs into them. Also, yeast-foods, baking powders, and emulsifiers can be arbitrarily used. It is advantageous to produce sweetened bean jam buns, curry buns, prepared food buns, and Chinese steamed buns by folding ingredients such as seasoned- and/or cooked-sweetened bean jams, curries, and various prepared foods using vegetables, fruits, meats, eggs, fishes.

Optionally, for producing the doughs for bakery products in the present invention, method can be arbitrarily selected from "ALL-IN-ONE method (straight dough method)" of kneading and fermenting all materials at the same time, "soaker and dough method" of gelatinizing a part of materials except for yeast in advance, disclosed in Japanese Patent Kokai No. 245,332/2000, and "sponge and dough method" of preparing a sponge in advance.

Conventional methods such as baking, frying, steaming, heating by microwave irradiation, and the like can be arbitrarily used for heating the fermented dough. For example, heating dough from upper and/or lower side using an oven and heating dough by contacting directly with pre-heated kiln can be used as baking methods. For example, cooking methods using edible oil such as browning and frying can be used as frying methods. For example, steaming by using a steamer which generates steam by boiling water on flame, and blowing steam produced using a boiler into a container can be used as steaming methods. For example, heating by using an equipment or system having a function of generating and irradiating microwave can be used as a heating method with microwave.

As described above, according to the present invention, high quality bakery products with a prolonged fermentation speed and a satisfactory working efficiency and a satisfactory appearance, crumb, taste, and preservability in comparison with those produced by conventional processes using rice flour as a major material can be provided by incorporating gluten and less-fermentable saccharide into rice flour in a prescribed proportion, preferably, incorporating saccharide selected from the group consisting of oligosaccharides and sugar alcohols into rice flour and gluten. Also, premixed flour and fermented dough for producing high quality bakery products with a prolonged fermentation speed and a satisfactory working efficiency and a satisfactory appearance, crumb, taste, and preservability in comparison with those produced by conventional process using rice flour as a major material can be provided by incorporating gluten and less-fermentable saccharide into rice flour in a prescribed proportion, preferably, incorporating saccharide selected from the group consisting of oligosaccharides and sugar alcohols into rice flour and gluten. Therefore, various bakery products, having good qualities, such as bread, bread roll (bun), loaf, French bread, German bread, raisin bread, bagel, Danish pastry, pretzel, pie, scone, steamed cake, Chinese steamed bread, yeast raised doughnut, pizza, and nan bread can be produced easily and in good working efficiency. The bakery products of the present invention, thus obtained, have satisfactory tolerances to refrigeration and freezing and can be preserved easily by these methods for a long period. Optionally, it is advantageous to taste the preserved bakery product after thawing and heating. Since the bakery product of the present invention is produced by using rice flour as a major material, the bakery product has a small risk to cause a wheat allergy different from the case of bakery product produced using convenient wheat flour as material. As referred to the taste, the bakery products of the present invention go well in taste with dairy products such as milk and cheese and livestock products such as meat, egg, and mayonnaise as in the case of convenient bakery products produced by using wheat flour as material. In addition, the bakery products of the present invention have a feature of harmonizing well in taste with ingredients of rice ball such as salted Japanese apricot, pickles, shavings of dried bonito, seasoned layer, food boiled in soy sauce, "miso (soybean paste)"-taste prepared foods such as "miso" soup and preserve in soybean paste, soy sauce-taste prepared foods such as clear soup and "kanro-ni (stew in soy sauce and sugar)", various Japanese prepared foods such as quick-seared bonito, vinegared mackerel, various tempura, saute'ed burdock "kinpira"-style, and braised meat and potatoes, and Korean prepared foods such as kimchi and grilled meat.

The following experiments explain the present invention concretely:

Experiment 1

Effects of the Amount of Water in Preparing Fermented Doughs Using Rice Flour as a Major Material on the Applicability of the Dough and the Qualities of Bakery Products In order to investigate the amount of water to rice flour, applicability of the resulting dough and the qualities (appearance, taste, and preservability) of the resulting bakery products, seven kinds of doughs were prepared as follows:
- (a) Mix 118 parts by weight (corresponding 100 parts by weight of rice flour) of "KOMENO-KO (for bread)", a rice flour comprising 15% gluten, commercialized by Saito Seifun Inc., Niigata, Japan, 3.5 parts by weight of sucrose as an easily-fermentable saccharide, 8.5 parts by weight of maltose as a less-fermentable saccharide, two parts by weight of sodium chloride, 10 parts by weight of a salt-free butter, 2.5 parts by weight of a cellulose derivative, and 2.5 parts by weight of a yeast; and
- (b) Add 70, 85, 92, 100, 107, 115, or 130 parts by weight of water to the above mixture (to 100 parts by weight of rice flour).

"MALTOSE HHH", a high purity hydrous crystalline maltose commercialized by Hayashibara Biochemical Laboratories, Inc., Okayama, Japan, "CELLOGEN", a carboxymethyl-cellulose sodium salt commercialized by Dai-ichi Kogyo Seiyaku Co., Ltd., Kyoto, Japan, and "KAIYO KOBO", a yeast commercialized by Sankyo Foods Co., Ltd., Tokyo, Japan, were used as maltose, cellulose derivative, and yeast, respectively. The mixture of materials was kneaded using a kneader for five minutes at a low speed and two minutes at a moderate speed while keeping the temperature at 20 to 24° C. After stopping the kneading for a while, the mixture was further kneaded for two minutes at a moderate speed to make into dough. The results of the evaluation of dough are in Table 1.

TABLE 1

| Water added to rice flour (%) | Applicability of dough |
|---|---|
| 70 | Defective (Non-uniform) |
| 85 | Normal |
| 92 | Normal |
| 100 | Normal |
| 107 | Normal |
| 115 | Normal |
| 130 | Defective (Too tender) |

As shown in Table 1, although the dough prepared by adding 130% of water to rice flour can be kneaded, the dough was defective for producing a bakery product because the dough was too tender. On the other hand, the dough prepared by adding 70% of water to rice flour was non-uniform because of its shortage of water and an unsatisfactory working efficiency and mechanical aptitude. Five kinds of dough, prepared by adding water in an amount of 85-115% to rice flour, were evaluated to be normal.

Successively, breads were produced using the seven kinds of dough, respectively. At first, after fermenting each dough for 65 minutes (as "floor time"), the resulting each fermented dough was divided to 100 grams each, rounded, and then aged for 15 minutes (as "bench time"). Successively, the dough were shaped and further fermented for 50 minutes (as "proofing time") in a proofing room controlled at 38° C. and a humidity of 75%. After the fermentation, the resulting dough were baked for 15 minutes in an oven which the upper and lower temperatures were controlled to 230° C. and 200° C., respectively, to produce breads.

Qualities of the bread obtained by baking were evaluated into three grades of "Good", "Normal", and "Defective" by a panel test with seven panelists. Evaluation items were selected as follows:

Appearance: Caving from tin, bulge, and color;

Crumb: Sectional texture, color, and feel; and

Taste: Flavor (taste and smell) and mouthfeel.

In the case of being varied the judgement of panelists, a grade with the highest score, i.e., the panelist number was selected for each evaluation item. The evaluation results of the breads are in Table 2.

TABLE 2

| Water added to rice flour (%) | Evaluation | | | | | | | |
|---|---|---|---|---|---|---|---|---|
| | Appearance | | | Crumb | | | Taste | |
| | Caving | Bulge | Color | Texture | Color | Feel | Flavor | Mouthfeel |
| 70 | D | D | N | D | N | D | D | D |
| 85 | N | N | N | N | N | N | N | N |
| 92 | N | N | N | G | N | N | G | N |
| 100 | N | N | N | G | N | N | G | N |
| 107 | N | N | N | G | N | N | G | N |
| 115 | N | N | N | N | N | N | N | N |
| 130 | D | D | N | D | N | D | D | D |

D; Defective,
N; Normal,
G; Good

As shown in Table 2, the bread prepared by adding 70% or 130% of water had disadvantages of showing defective appearance, crumb, and taste. The amount of water, which gave a satisfactory applicability of dough for producing breads and qualities of baked breads, was 85% or higher but 115% or lower, more preferably, 92% or higher but 107% or lower, to rice flour.

Experiment 2

Effect of Maltose Concentration on the Production of Bakery Products Using Rice Flour as a Major Material In order to investigate the effect of concentration of maltose, a less-fermentable saccharide, on the preparation of bakery products using rice flour as a major material, seven kinds of dough were prepared using the same composition and method in Experiment 1, except for adding both 0, 3, 6, 8, 10, 20, or 25 parts by weight, d.s.b., of "MALTOSE HHH", a reagent grade of high purity hydrous crystalline maltose, and 95 parts by weight of water to 100 parts by weight of rice flour.

Successively, in order to evaluate the working efficiency for producing bakery products in detail, fermentation states of dough in the following three fermentation processes were evaluated according to the following procedures, respectively:

"Floor time" (primary fermentation)

A portion of dough in a volume of 100 ml was placed in a beaker, covered with a wet cloth, and fermented by keeping under the conditions of 25° C. and a humidity of 75% for a period corresponding to that of "floor time" as used in conventional breadmaking. The time which the dough reached prescribed fermentation state and the bulks of the dough before and after the fermentation were measured.

"Bench time" (aging)

The dough obtained by the above fermentation was kneaded to remove a part of internal carbon dioxide bubbles generated by fermentation, and further fermented for 15 minutes, a period corresponding to that of "bench time" used in conventional breadmaking. The bulks of the dough before and after the fermentation were measured.

"Proofing time" (secondary fermentation)

The dough obtained by the above fermentation was kneaded to remove a part of internal carbon dioxide bubbles generated by fermentation, and then placed in a beaker again, covered with a wet cloth, and further fermented using a proofing room controlled at 38° C. and a humidity of 75% for a period corresponding to that of "proofing time" used in conventional breadmaking. The time which the dough reached a prescribed fermentation state and the bulks of the dough before and after the fermentation were measured.

Respective dough after the "bench time", prepared by the same procedure as described above, was divided into an aliquot of 40 grams and rounded and further fermented in a proofing room. After the fermentation, breads were prepared by baking each dough for 15 minutes in an oven which the upper and lower temperatures were controlled to 230° C. and 200° C., respectively. As a control, a fermented wheat flour bread was prepared simultaneously by producing a fermented dough according to the procedure described above except for using 100 parts by weight of wheat strong flour instead of 100 parts by weight of rice flour and not adding maltose. The time until the dough reached a prescribed fermentation state and the bulk ratio when the dough reached the state in respective fermentation processes are in Table 3. The results of quality evaluation of the breads obtained are in Table 4.

The bulk ratio was calculated from the bulk of dough before and after fermentation using the following equation:

Bulk ratio=(BD after fermentation)/(BD before fermentation) BD; bulk of dough

Working efficiency was judged based on the time required in processes of "floor time" and "proofing time", and evaluated as "Good" in the case of requiring the time for respective processes of 30 minutes or longer. In addition to the quality evaluation of bread just after baking, which was carried out in Experiment 1, the preservability of breads was evaluated with a standard of two grades, "Good" and "Defective", after preserving the breads in a refrigerator at 5° C. for seven days, returning them to room temperature, and subjecting them to a sensory test by seven panelists.

TABLE 3

| Mal content (%) | Floor time Primary fermentation Time (min) | Floor time Primary fermentation Bulk ratio | Bench time Aging Time (min) | Bench time Aging Bulk ratio | Proofing time Secondary fermentation Time (min) | Proofing time Secondary fermentation Bulk ratio | Working efficiency |
|---|---|---|---|---|---|---|---|
| 0 | 52 | 2.0 | 15 | 1.4 | 5 | 1.4 | D |
| 3 | 56 | 2.0 | 15 | 1.3 | 18 | 1.5 | D |
| 6 | 63 | 2.2 | 15 | 1.4 | 34 | 2.1 | G |
| 8 | 67 | 2.4 | 15 | 1.5 | 50 | 2.3 | G |
| 10 | 72 | 2.5 | 15 | 1.6 | 60 | 2.3 | G |
| 20 | 110 | 2.5 | 15 | 1.3 | 108 | 2.4 | G |
| 25 | 125 | 2.4 | 15 | 1.2 | 135 | 2.4 | D |
| Control | 90 | 2.5 | 15 | 1.5 | 90 | 2.1 | G |

Mal; Maltose,
D; Defective,
G; Good

As is evident from the experimental results in Table 3, in comparison with the control dough prepared with wheat flour, the dough having a maltose content to rice flour as low as 0% or 3% were fermented quickly, but the bulk ratios of the fermented dough were decreased. Also, these doughs had a defective working efficiency of requiring extreme cut of working time because of the short "proofing time". While, in the case of the doughs having a maltose content to rice flour of 6% or higher, the fermentation rate was slowed down and the time for fermentation was prolonged. However, the doughs showed almost the same bulk ratios as that of control, and gave high quality breads having a satisfactory bulk after baking. Particularly, the doughs having a maltose content to rice flour of 8% or higher showed satisfactory bulk ratios after fermentation. However, the doughs having a maltose content to rice flour of 25% or higher made working efficiency worse because of their extremely long "proofing time". Therefore, taking account of the bulk ratio of dough and the working efficiency for the preparation of bread, it was revealed that the maltose content to rice flour was preferably in the rage of 6% or higher but 20%, or lower, more preferably, in the range of 8% or higher but 20% or lower.

TABLE 4

| Mal content (%) | Appearance Caving | Appearance Bulge | Appearance Color | Crumb Texture | Crumb Color | Crumb Feel | Taste Flavor | Taste Mouthfeel | Preservability Taste Flavor | Preservability Taste Mouthfeel |
|---|---|---|---|---|---|---|---|---|---|---|
| 0 | D | D | N | D | N | D | D | D | D | D |
| 3 | D | D | N | D | N | D | N | N | D | D |
| 6 | N | N | N | N | N | N | N | N | D | D |
| 8 | N | N | N | G | N | N | G | N | G | G |
| 10 | N | N | N | G | N | N | G | N | G | G |
| 20 | N | N | N | G | N | N | G | N | G | G |

TABLE 4-continued

| Mal content (%) | Evaluation | | | | | | | | Preservability | |
|---|---|---|---|---|---|---|---|---|---|---|
| | Appearance | | | Crumb | | | Taste | | Taste | |
| | Caving | Bulge | Color | Texture | Color | Feel | Flavor | Mouthfeel | Flavor | Mouthfeel |
| 25 | N | N | N | G | N | N | G | N | G | G |
| Control | N | N | N | N | N | N | N | N | D | D |

Mal; Maltose,
D; Defective,
N; Normal,
G; Good

As is evident from the experiment results shown in Table 4, the breads prepared by adding 0% and 3% maltose to rice flour were evaluated as "Defective" in caving and bulge of appearance, and in texture and feel of crumb. Also, the breads were evaluated as "Defective" or "Normal", and good evaluations were not obtained. Furthermore, the preservabilities of breads (taste after preserving) were evaluated as "Defective" because of deterioration of flavor and mouthfeel. On the other hand, in the case of a bread prepared by adding 6% maltose to rice flour, the appearance, crumb, and taste of the bread were evaluated as "Normal", but preservability was evaluated as "Defective". The breads prepared by adding maltose in an amount of 8% or higher to rice flour were evaluated as "Normal" or "Good" in all evaluation items, and it was revealed that the breads had a normal appearance, crumb, and taste. In addition, since the deterioration of taste, i.e., decreasing of flavor and stiffening, was not observed after preservation of the breads, the preservabilities of the breads were evaluated as "Good". Accordingly, it was also revealed that the preferable amount of maltose to rice flour is 6% or higher, more preferably, 8% or higher from the panel test.

From the results in the experiment, it was revealed that the preferable amount of maltose to rice flour is in the range of 6% or higher but 20% or lower, more preferably, 8% or higher but 20% or lower.

Experiment 3

Effect of Maltitol Concentration on the Production of Bakery Products Using Rice Flour as a Major Material In order to investigate the effect of concentration of maltitol, a less-fermentable saccharide, on the preparation of bakery products using rice flour as a major material, seven kinds of breads were prepared using the same method in Experiment 2, except for using maltitol instead of maltose and using "MALTITOL", a reagent grade high purity anhydrous crystalline maltitol produced by Hayashibara Biochemical Laboratories Inc., Okayama, Japan, and those qualities were evaluated. The results were in Tables 5 and 6.

TABLE 5

| | Measurement | | | | | | |
|---|---|---|---|---|---|---|---|
| | Floor time Primary fermentation | | Bench time Aging | | Proofing time Secondary fermentation | | |
| $G_2OH$ content (%) | Time (min) | Bulk ratio | Time (min) | Bulk ratio | Time (min) | Bulk ratio | Working efficiency |
| 0 | 52 | 2.0 | 15 | 1.4 | 5 | 1.4 | D |
| 3 | 55 | 1.9 | 15 | 1.3 | 18 | 1.4 | D |
| 6 | 60 | 2.1 | 15 | 1.5 | 31 | 2.0 | G |
| 8 | 66 | 2.4 | 15 | 1.5 | 48 | 2.2 | G |
| 10 | 72 | 2.5 | 15 | 1.6 | 60 | 2.3 | G |
| 20 | 110 | 2.5 | 15 | 1.3 | 108 | 2.4 | G |
| 25 | 125 | 2.4 | 15 | 1.2 | 135 | 2.4 | D |
| Control | 90 | 2.5 | 15 | 1.5 | 90 | 2.1 | G |

$G_2OH$, Maltitol,
D; Defective,
G; Good

As is evident from the experimental results in Table 5, in comparison with the control dough prepared with wheat flour, the dough having a maltitol content to rice flour as low as 0% or 3% were fermented quickly, but bulk ratios of the fermented dough were decreased. Also, the doughs had a defective working efficiency of requiring extreme cut of working time because of the short "proofing time". While, in the case of the doughs having a maltitol content to rice flour of 6% or higher, the fermentation rate was slowed down and the time for fermentation was prolonged. However, the doughs showed almost the same bulk ratios as that of control, and gave high quality bakery products having a satisfactory bulk after baking. Particularly, the doughs having a maltitol content to rice flour of 8% or higher showed satisfactory bulk ratios after fermentation. However, in comparison with the results of doughs having a maltitol content of 6% or 8% to rice flour and those in the case of maltose in Experiment 2, the result of maltose was superior rather than that of maltitol. The dough having a maltitol content to rice flour of 25% or higher made working efficiency worse because of their extremely long "proofing time". Therefore, taking account of the bulk ratio of dough and the working efficiency for the preparation of bread, it was revealed that the maltitol content to rice flour was preferably in the range of 6% or higher but 20% or lower, more preferably, in the range of 8% or higher but 20% or lower.

TABLE 6

| G₂OH content (%) | Evaluation | | | | | | | | Preservability | |
|---|---|---|---|---|---|---|---|---|---|---|
| | Appearance | | | Crumb | | | Taste | | Taste | |
| | Caving | Bulge | Color | Texture | Color | Feel | Flavor | Mouthfeel | Flavor | Mouthfeel |
| 0 | D | D | N | D | N | D | D | D | D | D |
| 3 | D | D | N | D | N | D | N | N | D | D |
| 6 | N | N | N | N | N | N | N | N | D | D |
| 8 | N | N | N | G | N | N | G | N | G | G |
| 10 | N | N | N | G | N | N | G | N | G | G |
| 20 | N | N | N | G | N | N | G | N | G | G |
| 25 | N | N | N | G | N | N | G | N | G | G |
| Control | N | N | N | N | N | N | N | N | D | D |

G₂OH; Maltitol,
D; Defective,
N; Normal,
G; Good

As is evident from the experimental results in Table 6, the breads prepared by adding 0% and 3% maltitol to rice flour were evaluated as "Defective" in caving and bulge of appearance, and in texture and feel of crumb. Also, the breads were evaluated as "Defective" or "Normal", and good evaluations were not obtained. Furthermore, the preservabilities of breads (taste after preserving) were evaluated as "Defective" because of deterioration of flavor and mouthfeel. On the other hand, in the case of a bread prepared by adding 6% maltitol to rice flour, the appearance, crumb, and taste of the bread were evaluated as "Normal", but preservability was evaluated as "Defective". The breads prepared by adding maltitol of 8% or higher to rice flour were evaluated as "Normal" or "Good" in all evaluation items, and it was revealed that the breads had a normal appearance, crumb, and taste. In addition, since the deterioration of taste, decreasing of flavor and stiffening, were not observed after preservation of the breads, the preservabilities of the breads were evaluated to be "Good". Accordingly, it was also revealed that the preferable amount of maltitol to rice flour is 6% or higher, more preferably, 8% or higher from the panel test.

From the results in the experiment, it was revealed that the preferable amount of maltitol to rice flour is in the range of 6% or higher but 20% or lower, more preferably, 8% or higher but 20% or lower, as in the case of Experiment 2.

Experiment 4

Effect of Concentration of a Mixture of Maltose and Maltitol in Equal Amount on the Production of Bakery Products Using Rice Flour as a Major Material In order to investigate the effect of concentration of a mixture of maltose and maltitol in equal amount on the preparation of bakery product using rice flour as a major material, seven kinds of breads were prepared using the same method in Experiment 2, except for using a half amount of maltose in Experiment 2 was replaced with maltitol (maltose:maltitol=1:1, w/w, d.s.b.) and using "MALTITOL", a reagent grade of high purity anhydrous crystalline maltitol produced by Hayashibara Biochemical Laboratories Inc., Okayama, Japan, and those qualities were evaluated. The results are in Tables 7 and 8.

TABLE 7

| | Measurement | | | | | | |
|---|---|---|---|---|---|---|---|
| Mal + G₂OH | Floor time Primary fermentation | | Bench time Aging | | Proofing time Secondary fermentation | | |
| content (%) | Time (min) | Bulk ratio | Time (min) | Bulk ratio | Time (min) | Bulk ratio | Working efficiency |
| 0 | 52 | 2.0 | 15 | 1.4 | 5 | 1.4 | D |
| 3 | 55 | 2.0 | 15 | 1.2 | 18 | 1.5 | D |
| 6 | 63 | 2.2 | 15 | 1.5 | 34 | 2.1 | G |
| 8 | 66 | 2.4 | 15 | 1.5 | 50 | 2.3 | G |
| 10 | 72 | 2.5 | 15 | 1.6 | 60 | 2.3 | G |
| 20 | 110 | 2.5 | 15 | 1.3 | 108 | 2.4 | G |
| 25 | 125 | 2.4 | 15 | 1.2 | 135 | 2.4 | D |
| Control | 90 | 2.5 | 15 | 1.5 | 90 | 2.1 | G |

Mal; Maltose,
G₂OH; Maltitol,
D; Defective,
G; Good

As is evident from the experimental results in Table 7, in comparison with the control dough prepared with wheat flour, the dough having a mixture of maltose and maltitol in equal amount content to rice flour as low as 0% and 3% were fermented quickly, but the bulk ratios of the fermented dough were decreased. Also, the doughs had a defective working efficiency of requiring extreme cut of working time because of the short "proofing time". While, in the case of the doughs having a mixture of maltose and maltitol in equal amount content to rice flour of 6% or higher, the fermentation rate was slowed down and the time for fermentation was prolonged. However, the doughs showed almost the same bulk ratios as that of control, and gave high quality bakery products having a satisfactory bulk after baking. Particularly, the doughs having a mixture of maltose and maltitol in equal amount content to rice flour of 8% or higher showed satisfactory bulk ratios after fermentation. However, in comparison with the results of doughs having a mixture of maltose and maltitol in equal amount content of 6% or 8% to rice flour and those in the case of maltose in Experiment 2 or maltitol in Experiment 3, the result of a mixture of maltose and maltitol in equal amount was superior rather than that of maltitol in Experiment 3 and similar with that of maltose in Experiment 2. The dough having a mixture of maltose and maltitol in equal amount content to rice flour of 25% or higher made working efficiency worse because of their extremely long "proofing time". Therefore, taking account of the bulk ratio of dough and the working efficiency for the preparation of bread, it was revealed that the mixture of maltose and maltitol in equal amount content to rice flour was preferably in the range of 6% or higher but 20% or lower, more preferably, in the range of 8% or higher but 20% or lower.

TABLE 8

| Mal + G$_2$OH content (%) | Evaluation | | | | | | | | Preservability | |
|---|---|---|---|---|---|---|---|---|---|---|
| | Appearance | | | Crumb | | | Taste | | Taste | |
| | Caving | Bulge | Color | Texture | Color | Feel | Flavor | Mouthfeel | Flavor | Mouthfeel |
| 0 | D | D | N | D | N | D | D | D | D | D |
| 3 | D | D | N | D | N | D | N | N | D | D |
| 6 | N | N | N | N | N | N | N | N | D | D |
| 8 | N | N | N | G | N | N | G | N | G | G |
| 10 | N | N | N | G | N | N | G | N | G | G |
| 20 | N | N | N | G | N | N | G | N | G | G |
| 25 | N | N | N | G | N | N | G | N | G | G |
| Control | N | N | N | N | N | N | N | N | D | D |

Mal; Maltose,
G$_2$OH; Maltitol,
D; Defective,
N; Normal,
G; Good

As is evident from the experimental results in Table 8, the breads prepared by adding 0% and 3% of a mixture of maltose and maltitol in equal amount to rice flour was evaluated as "Defective" in caving and bulge of appearance, and in texture and feel of crumb. Also, the breads were evaluated as "Defective" or "Normal", and good evaluations were not obtained. Furthermore, the preservabilities of breads (taste after preserving) were evaluated as "Defective" because of deterioration of flavor and mouthfeel. On the other hand, in the case of a bread prepared by adding 6% a mixture of maltose and maltitol in equal amount to rice flour, the appearance, crumb, and taste of the bread were evaluated as "Normal", but the preservability was evaluated as "Defective". Breads prepared by adding a mixture of maltose and maltitol in equal amount of 8% or higher to rice flour were evaluated as "Normal" or "Good" in all evaluation items, and it was revealed that the breads had a normal appearance, crumb, and taste. In addition, since the deterioration of taste, i.e., decreasing of flavor and stiffening, was not observed after preservation of the breads, the preservabilities of the breads were evaluated as "Good". Accordingly, it was also revealed that the preferable amount of a mixture of maltose and maltitol in equal amount to rice flour is 6% or higher, more preferably, 8% or higher from the panel test.

From the results in the experiment, it was revealed that the preferable amount of a mixture of maltose and maltitol in equal amount to rice flour is in the range of 6% or higher but 20% or lower, more preferably, 8% or higher but 20% or lower, as in the cases of Experiment 2 and Experiment 3.

Experiment 5

Effect of Concentration of a Mixture of Maltose, Maltitol and α,α-Trehalose (4:4:2) on the Production of Bakery Products Using Rice Flour as a Major Material In order to investigate the effect of concentration of a mixture of maltose, maltitol and α,α-trehalose (4:4:2) on the preparation of bakery products using rice flour as a major material, seven kinds of breads were prepared using the same method in Experiment 2, except for using a mixture of maltose, maltitol, and α,α-trehalose (ratio of maltose:maltitol:α,α-trehalose=4:4:1, w/w, d.s.b.) instead of maltose in Experiment 2 and using "MALTOSE HHH", a reagent grade of high purity hydrous crystalline maltose produced by Hayashibara Biochemical Laboratories Inc., Okayama, Japan, as maltose, "MALTITOL", a reagent grade of high purity anhydrous crystalline maltitol produced by Hayashibara Biochemical Laboratories Inc., Okayama, Japan, as maltitol, and "TREHA®", a high purity hydrous crystalline α,α-trehalose commercialized by Hayashibara Shoji Inc., Okayama, Japan, as α,α-trehalose, and those qualities were evaluated. The results are in Tables 9 and 10.

TABLE 9

| Mal + G$_2$OH + Tre content (%) | Measurement | | | | | | |
|---|---|---|---|---|---|---|---|
| | Floor time Primary fermentation | | Bench time Aging | | Proofing time Secondary fermentation | | Working efficiency |
| | Time (min) | Bulk ratio | Time (min) | Bulk ratio | Time (min) | Bulk ratio | |
| 0 | 52 | 2.0 | 15 | 1.4 | 5 | 1.4 | D |
| 3 | 55 | 2.1 | 15 | 1.3 | 18 | 1.6 | D |
| 6 | 64 | 2.4 | 15 | 1.5 | 36 | 2.2 | G |
| 8 | 68 | 2.5 | 15 | 1.5 | 50 | 2.3 | G |
| 10 | 72 | 2.5 | 15 | 1.6 | 60 | 2.3 | G |
| 20 | 110 | 2.5 | 15 | 1.3 | 108 | 2.4 | G |
| 25 | 125 | 2.4 | 15 | 1.2 | 135 | 2.4 | D |
| Control | 90 | 2.5 | 15 | 1.5 | 90 | 2.1 | G |

Mal; Maltose,
G$_2$OH; Maltitol,
Tre; α,α-trehalose,
D; Defective,
G; Good

As is evident from the experimental results in Table 9, in comparison with the control dough prepared with wheat flour, the dough having a mixture of maltose, maltitol and α,α-trehalose (4:4:2) content to rice flour as low as 0% or 3% were fermented quickly, but the bulk ratios of the fermented dough were decreased. Also, these doughs had a defective working efficiency of requiring extreme cut of working time because of the short "proofing time". While, in the case of the doughs having a mixture of maltose, maltitol and α,α-trehalose (4:4:2) content to rice flour of 6% or higher, the fermentation rate was slowed down and the time for fermentation was prolonged. However, the doughs showed almost the same bulk ratios as that of control, and gave high quality bakery products having a satisfactory bulk after baking. Particularly, the doughs having a mixture of maltose, maltitol and α,α-trehalose (4:4:2) content to rice flour of 8% or higher showed satisfactory bulk ratios after fermentation. However, in comparison with the results of dough having a mixture of maltose, maltitol and α,α-trehalose (4:4:2) content of 6% or 8% to rice flour and those in the cases of maltose in Experiment 2, of maltitol in Experiment 3, and of a mixture of maltose and maltitol in equal amount in Experiment 4, the result of a mixture of maltose, maltitol and α,α-trehalose (4:4:2) was superior rather than those of maltose in Experiment 2, of maltitol in Experiment 3, and of a mixture of maltose and maltitol in equal amount in Experiment 4. It was considered that the addition of α,α-trehalose gave good results. The doughs having a mixture of maltose, maltitol and α,α-trehalose (4:4:2) content to rice flour of 25% or higher made working efficiency worse because of their extremely long "proofing time". Therefore, taking account of the bulk ratio of dough and the working efficiency for the preparation of bread, it was revealed that the mixture of maltose, maltitol and α,α-trehalose (4:4:2) content to rice flour was preferably in the range of 6% or higher but 20% or lower, more preferably, in the range of 8% or higher but 20% or lower.

ration of taste, i.e., decreasing of flavor and stiffening, was not observed after preservation of the breads, the preservabilities of the breads were evaluated as "Good". Accordingly, it was also revealed that the preferable amount of a mixture of maltose, maltitol and α,α-trehalose (4:4:2) to rice flour is 6% or higher, more preferably, 8% or higher from the panel test.

From the results in the experiment, it was revealed that the preferable amount of a mixture of maltose, maltitol and α,α-trehalose (4:4:2) to rice flour is in the range of 6% or higher but 20% or lower, more preferably, 8% or higher but 20% or lower, as in the cases of Experiment 2, Experiment 3 and Experiment 4.

Experiment 6

Effect of Water-Soluble Polysaccharide Concentration on the Production of Bakery Products Comprising Less-Fermentable Saccharide and Using Rice Flour as a Major Material In order to investigate the effect of a water-soluble polysaccharide concentration on the production of bakery products comprising less-fermentable saccharide and using rice flour as a major material, following experiment was carried out. One hundred and eighteen parts by weight (corresponding to 100 parts by weight of rice flour) of "KOMENO-KO (for bread)", a rice flour comprising 15% gluten, commercialized by Saito Seifun Inc., Niigata, Japan, six, eight or 10 parts by

TABLE 10

| Mal + G$_2$OH + Tre content (%) | Evaluation | | | | | | | | Preservability | |
|---|---|---|---|---|---|---|---|---|---|---|
| | Appearance | | | Crumb | | | Taste | | Taste | |
| | Caving | Bulge | Color | Texture | Color | Feel | Flavor | Mouthfeel | Flavor | Mouthfeel |
| 0 | D | D | N | D | N | D | D | D | D | D |
| 3 | D | D | N | D | N | D | N | N | D | D |
| 6 | N | N | N | N | N | N | N | N | D | D |
| 8 | N | N | N | G | N | N | G | N | G | G |
| 10 | N | N | N | G | N | N | G | N | G | G |
| 20 | N | N | N | G | N | N | G | N | G | G |
| 25 | N | N | N | G | N | N | G | N | G | G |
| Control | N | N | N | N | N | N | N | N | D | D |

Mal; Maltose,
G$_2$OH; Maltitol,
Tre; α,α-trehalose,
D; Defective,
N; Normal,
G; Good As is evident from the experimental results in Table 10, the breads prepared by adding 0% and 3% of a mixture of maltose, maltitol and α,α-trehalose (4:4:2) to rice flour was evaluated as "Defective" in carving and bulge of appearance, and in texture and feel of crumb. Also the breads were evaluated as "Defective" or "Normal", and good evaluations were not obtained. Furthermore, the preservabilities of breads (taste after preserving) were evaluated as "Defective" because of deterioration of flavor and mouthfeel. On the other hand, in the case of a bread prepared by adding 6% of a mixture of maltose, maltitol and α,α-trehalose (4:4:2) to rice flour, the appearance, crumb, and taste of the bread were evaluated as "Normal", but the preservability was evaluated as "Defective". The breads prepared by adding a mixture of maltose, maltitol and α,α-trehalose (4:4:2) of 8% or higher to rice flour were evaluated as "Normal" or "Good" in all evaluation items, and it was revealed that the breads had a normal appearance, crumb, and taste. In addition, since the deterioweight of a mixture of "MALTOSE HHH", a reagent grade high purity hydrous crystalline maltose produced by Hayashibara Biochemical Laboratories Inc., Okayama, Japan, "MALTITOL", a reagent grade high purity anhydrous crystalline maltitol produced by Hayashibara Biochemical laboratories Inc., Okayama, Japan, and "TREHA®", a high purity hydrous crystalline α,α-trehalose commercialized by Hayashibara Shoji Inc., Okayama, Japan, (maltose:maltitol:α,α-trehalose=4:2:4, d.s.b.) as a less-fermentable saccharide, two parts by weight of sucrose, two parts by weight of sodium chloride, two parts by weight of "KAIYO KOBO", a yeast commercialized by Sankyo Foods Co., Ltd., Tokyo, Japan, 10 parts by weight of a salt-free butter, 0, 0.5, 1, 2.5, 5 or 7.5 parts by weight of "CELLOGEN", a carboxymethyl-cellulose sodium salt commercialized by Dai-ichi Kogyo Seiyaku Co., Ltd., Kyoto, Japan, as a water-soluble polysaccharide, and 75 parts by weight of water were mixed and kneaded using a kneader for five minutes at a low speed and six minutes at a moderate speed at 25° C. After stopping the kneading for a while, the mixture was further kneaded for 4.5 minutes at a moderate speed to make into doughs. Successively, each dough was fermented for 70 minutes as "floor time". After dividing the dough into aliquots of 40 grams each, rounding and fermenting for 15 minutes as "bench time", each dough was shaped and further fermented for 60 minutes in a proofing room controlled at 38° C. and a humidity of 75% as "proofing time". After the fermentation, each dough was baked for 15 minutes in an oven which the upper and lower temperatures were controlled to 230° C. and 200° C., respectively, to produce breads. The qualities of the resulting breads were evaluated just after baking as in the case of Experiment 1. The results are in Tables 11, 12, and 13, respectively.

TABLE 11

Saccharide conc. 6%, Mal:G$_2$OH:Tre (4:2:4)

| WSP Content (%) | Appearance | | | Crumb | | | Taste | |
|---|---|---|---|---|---|---|---|---|
| | Cav-ing | Bulge | Color | Tex-ture | Color | Feel | Flavor | Mouthfeel |
| 0 | D | D | N | D | N | D | G | D |
| 0.5 | D | D | N | D | N | D | G | D |
| 1 | N | N | N | G | N | N | G | N |
| 2.5 | N | N | N | G | N | N | G | N |
| 5 | N | N | N | G | N | N | G | N |
| 7.5 | D | D | N | N | N | D | D | D |

WSP; Water-soluble polysaccharide,
Mal; Maltose,
G$_2$OH; Maltitol,
Tre; α,α-Trehalose,
D; Defective,
N; Normal,
G; Good

TABLE 12

Saccharide conc. 8%, Mal:G$_2$OH:Tre (4:2:4)

| WSP content (%) | Appearance | | | Crumb | | | Taste | |
|---|---|---|---|---|---|---|---|---|
| | Cav-ing | Bulge | Color | Tex-ture | Color | Feel | Flavor | Mouthfeel |
| 0 | N | N | N | G | N | N | G | N |
| 0.5 | N | N | N | G | N | N | G | N |
| 1 | N | N | N | G | N | N | G | N |
| 2.5 | N | N | N | G | N | N | G | N |
| 5 | N | N | N | G | N | N | G | N |
| 7.5 | D | D | N | N | N | D | D | D |

WSP; Water-soluble polysaccharide,
Mal; Maltose,
G$_2$OH; Maltitol,
Tre; α,α-Trehalose,
D; Defective,
N; Normal,
G; Good

TABLE 13

Saccharide conc. 10%, Mal:G$_2$OH:Tre (4:2:4)

| WSP content (%) | Appearance | | | Crumb | | | Taste | |
|---|---|---|---|---|---|---|---|---|
| | Cav-ing | Bulge | Color | Tex-ture | Color | Feel | Flavor | Mouthfeel |
| 0 | N | N | N | G | N | N | G | N |
| 0.5 | N | N | N | G | N | N | G | N |
| 1 | N | N | N | G | N | N | G | N |
| 2.5 | N | N | N | G | N | N | G | N |
| 5 | N | N | N | G | N | N | G | N |
| 7.5 | D | D | N | N | N | D | D | D |

WSP; Water-soluble polysaccharide,
Mal; Maltose,
G$_2$OH; Maltitol,
Tre; α,α-Trehalose,
D; Defective,
N; Normal,
G; Good As is evident from the experimental results in Table 11, in the case of breads prepared by adding a mixture of maltose, maltitol, and α,α-trehalose (4:2:4) to rice flour, d.s.b., in an amount of 6% to rice flour, the bread prepared by adding a small amounts of water-soluble polysaccharide, carboxymethyl-cellulose to rice flour in an amount of 0% or 0.5% to rice flour was not bulged uniformly in fermentation and evaluated as "Defective" in caving and bulge of appearance, texture, feel, and mouthfeel. While, in the case of breads prepared by adding a relatively large amount of a water-soluble polysaccharide, carboxymethyl-cellulose, in an amount of 7.5% to rice flour, the bread was evaluated as "Defective" in caving and bulge in appearance, texture, feel, mouthfeel, and also flavor. In addition, the dough had the defects of showing a strong adherability because of its high viscosity, unsatisfactory handleability and bulge after fermentation.

Also, as is evident from the results in Tables 12 and 13, in the case of breads prepared by adding a mixture of maltose, maltitol, and α,α-trehalose (4:2:4), d.s.b., in an amount of 8% or 10%, the resulting breads were evaluated as "Normal" or "Good" in appearance, crumb and taste even in the absence of water-soluble polysaccharide.

Therefore, from the results of Experiments 2 to 5 and that of the present experiment, it was revealed that the preferable amount of less-fermentable saccharide is in the range of 6% or higher but 20% or lower, more preferably, 8% or higher but 20% or lower to rice flour, and the preferable amount of water-soluble polysaccharide is in the range of 5% or lower to rice flour.

Experiment 7

Effect of a Few Kinds of Less-Fermentable Saccharides on the Stiffening of Rice Flour Bakery Products Under Preservation In order to investigate the effect of a few kinds of less-fermentable saccharides on the stiffening of rice flour bakery product during preservation, six kinds of breads were prepared using the following material compositions. One hundred and eighteen parts by weight (corresponding to 100 parts by weight of rice flour) of "KOMENO-KO (for bread)", a rice flour comprising 15% gluten, commercialized by Saito Seifun Inc., Niigata, Japan, 10 parts by weight of any one of a few kinds of less-fermentable saccharides, three parts by weight of sucrose, two parts by weight of sodium chloride, two parts by weight of "KAIYO KOBO", a yeast commercialized by Sankyo Foods Co., Ltd., Tokyo, Japan, 10 parts by weight of a fresh cream, five parts by weight of a sugarless evaporated milk, four parts by weight of a shortening and 85 parts by weight of water were mixed and kneaded for six minutes at a low speed and three minutes at a moderate speed using a kneader at 23° C. After stopping the kneading for a while, the mixture was further kneaded for four minutes at a moderate speed to make doughs. Successively, after fermenting the dough for 50 minutes at room temperature as "floor time", the dough was divided into a dividing specific volume of 3.5 (235 grams, four pieces), rounded and fermented for 20 minutes as "bench time". Then, each dough was placed in a tin having a height of 3.5 cm to shape into a bread and further fermented for 50 minutes using a proofing room controlled at 40° C. and a humidity of 80% as "proofing time". After the fermentation, the resulting doughs were baked for 45 minutes in an oven which the upper and lower temperatures were controlled to 230° C. and 200° C., respectively, to produce breads.

As the above less-fermentable saccharide,

Ten parts by weight, d.s.b., of "MALTOSE HHH", a reagent grade high purity hydrous crystalline maltose produced by Hayashibara Biochemical Laboratories Inc., Okayama, Japan;

Ten parts by weight of "MALTITOL", a reagent grade high purity anhydrous crystalline maltitol produced by Hayashibara Biochemical laboratories Inc., Okayama, Japan;

A mixture of five parts by weight, d.s.b., of "MALTOSE HHH", a reagent grade high purity hydrous crystalline maltose produced by Hayashibara Biochemical Laboratories Inc., Okayama, Japan, and five parts by weight, d.s.b., of "MALTITOL" a reagent grade high purity anhydrous crystalline maltitol produced by Hayashibara Biochemical laboratories Inc., Okayama, Japan; or A mixture of four parts by weight d.s.b., of "MALTOSE HHH", a reagent grade high purity hydrous crystalline maltose produced by Hayashibara Biochemical Laboratories Inc., Okayama, Japan, two parts by weight, d.s.b., of "MALTITOL", a reagent grade high purity anhydrous crystalline maltitol produced by Hayashibara Biochemical laboratories Inc., Okayama, Japan, and four parts by weight, d.s.b., of "TREHA®", a high purity hydrous crystalline α,α-trehalose commercialized by Hayashibara Shoji Inc., Okayama, Japan;

were used. As a control 1, a bread was prepared by kneading dough according to the above procedure without adding any less-fermentable saccharide. As a control 2, a bread was prepared by kneading dough according to the above procedure except for using 10 parts by weight of sucrose (13 parts by weight of sucrose in total) instead of less-fermentable saccharide.

In order to investigate the change of hardness of breads prepared as described above under preservation, cube 25 mm on a side was carved out from bread preserved for zero, one, two, or three days at room temperature, respectively, and measured its penetrative destruction strength. Penetrative destruction strength was measured using "FUDOH RHEO METER NRM-2010J-CW", a rheometer commercialized by Leotec Inc., Kanagawa, Japan, and a plunger having a 25 mm diameter as an adapter, and by the steps of putting the bread cube on a sample stand, rising the sample stand to the plunger at a speed of 6 cm per minutes, and measuring a stress of penetrating the cube in 4 mm depth. The results are in Table 14.

TABLE 14

| | Hardness (Penetrative destruction strength, kg) Result of CBR plunger test | | | | | |
|---|---|---|---|---|---|---|
| Preservation Days (day) | Bread containing Mal | Bread containing $G_2OH$ | Bread containing (Mal + $G_2OH$) | Bread containing (Mal + $G_2OH$ + Tre) | Control 1 | Control 2 |
| 0 | 15.3 | 15.5 | 15.3 | 15.3 | 15.4 | 15.4 |
| 1 | 15.5 | 15.9 | 15.6 | 15.4 | 18.1 | 16.4 |
| 2 | 16.1 | 16.6 | 16.2 | 15.7 | 21.7 | 17.3 |
| 3 | 17.4 | 18.2 | 17.5 | 16.6 | 26.9 | 19.3 |

Mal; Maltose,
$G_2OH$; Maltitol,
Tre; α,α-Trehalose

As is evident from the results in Table 14, a bread of control 1, which is prepared by not adding any less-fermentable saccharide, had already started stiffening after preservation for one day at room temperature (25° C.). A bread of control 2, which was prepared by not adding any less-fermentable saccharide and substituting less-fermentable saccharide to the same amount of sucrose, showed a slow stiffening speed in comparison with a bread of control 1, but the stiffening was progressive. The stiffening speed of bread prepared by adding maltose was extremely decreased in comparison with that of a bread of control 1. Hardness of the bread preserved for three days at room temperature (25° C.) was evidently low in comparison with that of a bread of control 2. Although a bakery product prepared by adding maltitol showed fast progress of stiffening in comparison with the bakery product prepared by adding maltose, the stiffening of the bread was suppressed sufficiently in comparison with the bread of control 1, and slightly in comparison with that of control 2. Addition of a mixture of maltose and maltitol in equal amount to bread showed a effect of decreasing the stiffening speed of bread as in the case of bread prepared by adding only maltose. Furthermore, since the stiffening of bread prepared by adding maltose, maltitol, and α,α-trehalose in the ratio of 4:2:4 was evidently suppressed in comparison with the case of bread prepared by adding only maltose, a merit of adding α,α-trehalose was confirmed. It was revealed that the bakery product of the present invention showed extremely slow progress of stiffening and kept the high quality just after baking.

From the all experimental results described above, according to the present invention, it is evident that bakery products showing a satisfactory working efficiency in comparison with conventional bakery products using a rice flour comprising gluten and having satisfactory qualities (appearance, crumb, taste, preservability, etc.) can be produced by using rice flour along with gluten, easily-fermentable saccharide and less-fermentable saccharide, preferably, by using rice flour along with saccharide selected from the group consisting of oligosaccharides and sugar alcohols. The present invention activates rice-polishing industry, flour milling industry, bakery industry, feeding industry, catering industry, frozen-food industry, and food distribution industry such as convenient store and supermarket and makes a large contribution to rising of rice consumption and to improving Japan's self-sufficient ratio.

Although the following examples concretely explain the present invention, the present invention should not be restricted by them:

Example 1

Premixed Flour for Producing Rice Flour Breads

One hundred parts by weight of a fine rice flour having a grain size of less than 75 μm, obtained by milling a white rice using a mill and sifting with a 200-mesh sifter, 15 parts by weight of "GLURICH A", a gluten commercialized by Chiba Seifun Co. Ltd., Chiba, Japan, and 13 parts by weight, d.s.b., of "SUNMALT S", a purified maltose having a maltose content of 92% or higher, commercialized by Hayashibara Shoji Inc., Okayama, Japan, were mixed using a blender to produce a premixed flour for breadmaking.

The premixed flour has a satisfactory handleability and mechanical aptitude, and can be made into doughs having no adherability on the production of bread doughs. In comparison with the case of wheat flour, the doughs have substantially the same level of bulging and have a satisfactory working efficiency whereas the time for their fermentation on "floor time" and "bench time" was shortened. Breads, obtained by baking the doughs, exhibit no change of appearance, a large increase of bulk, and fluffy bulge, as well as a satisfactory color, sectional texture, and taste. Since the doughs comprise a prescribed amount of maltose as less-fermentable saccharide, they can be made into breads with a less-stiffening property and no change of taste. Even in the case of freezing the doughs after "bench time", they after thawing show no differential fermentability in comparison with the case of the doughs not frozen.

Example 2

Premixed Flour for Producing Rice Flour Breads

One hundred parts by weight of a fine rice flour having a grain size of less than 75 μm, obtained by milling a white rice using a mill and sifting with a 200-mesh sifter, 20 parts by weight of "GLURICH A", a gluten commercialized by Chiba Seifun Co. Ltd., Chiba, Japan, eight parts by weight, d.s.b., of "POWDERY MABIT", a maltitol product comprising maltitol of 93.5% or higher, commercialized by Hayashibara Shoji Inc., Okayama, Japan, and five parts by weight of "PULLULAN PF-20", pullulan commercialized by Hayashibara Shoji Inc., Okayama, Japan, were mixed using a blender to produce premixed flour for breadmaking.

The premixed flour has a satisfactory handleability and mechanical aptitude, and can be made into doughs having no adherability on the production of bread doughs. In comparison with the case of wheat flour, the doughs have substantially the same level of bulging and have a satisfactory working efficiency whereas the time for their fermentation on "floor time" and "bench time" was shortened. Breads, obtained by baking the doughs, exhibit no change of appearance, a large increase of bulk, and fluffy bulge, as well as a satisfactory color, sectional texture, and taste. Since the doughs comprise a prescribed amount of maltitol as less-fermentable sugar alcohol, they can be made into breads with a less-stiffening property and no change of taste. Even in the case of freezing the dough after "bench time", the doughs after thawing show no differential fermentability in comparison with the case of the doughs not frozen.

Example 3

Premixed Flour for Producing Rice Flour Breads

One hundred parts by weight of a fine rice flour having a grain size of less than 75 μm, obtained by milling a white rice using a mill and sifting with a 200-mesh sifter, 20 parts by weight of "GLURICH A", a gluten commercialized by Chiba Seifun Co. Ltd., Chiba, Japan, three parts by weight, d.s.b., of "SUNMALT S", a purified maltose product comprising maltose of 92% or higher, commercialized by Hayashibara Shoji Inc., Okayama, Japan, three parts by weight of "POWDERY MABIT", a maltitol product comprising maltitol of 93.5% or higher, commercialized by Hayashibara Shoji Inc., Okayama, Japan, and four parts by weight of "TREHA®", a high purity hydrous crystalline α,α-trehalose, commercialized by Hayashibara Shoji Inc., Okayama, Japan, were mixed using a blender to produce a premixed flour for breadmaking.

The premixed flour has a satisfactory handleability and mechanical aptitude, and can be made into doughs having no adherability on the production of bread doughs. In comparison with the case of wheat flour, the doughs have substantially the same level of bulging and have a satisfactory working efficiency whereas the time for their fermentation on "floor time" and "bench time" was shortened. Breads, obtained by baking the doughs, exhibit no change of appearance, a large increase of bulk, and fluffy bulge, as well as a satisfactory color, sectional texture, and taste. Since the doughs comprise a prescribed amount of maltose, maltitol, and α,α-trehalose as less-fermentable saccharides, they can be made into breads with a less-stiffening property and no change of taste. Even in the case of freezing the doughs after "bench time", they after thawing show no differential fermentability in comparison with the case of the doughs not frozen.

Example 4

Premixed Flour for Producing Rice Flour Breads

One hundred parts by weight of a fine rice flour having a grain size of less than 75 μm, obtained by milling a white rice using a mill and sifting with a 200-mesh sifter, 20 parts by weight of "GLURICH A", a gluten commercialized by Chiba Seifun Co. Ltd., Chiba, Japan, eight parts by weight, d.s.b., of "ISOMALT 900P", a isomaltooligosaccharide product comprising isomaltooligosaccharides of 85% or higher, commercialized by Hayashibara Shoji Inc., Okayama, Japan, four parts by weight of "TREHA®", a high purity hydrous crystalline α,α-trehalose, commercialized by Hayashibara Shoji Inc., Okayama, Japan, and two parts by weight of "MAGIC FAT 250", a powdery fat commercialized by Miyoshi Oil & Fat Co., Ltd., Tokyo, Japan, were mixed using a blender to produce a premixed flour for breadmaking.

The premixed flour has a satisfactory handleability and mechanical aptitude, and can be made into doughs having no adherability on the production of bread doughs. In comparison with the case of wheat flour, the doughs have substantially the same level of bulging and have a satisfactory working efficiency whereas the time for their fermentation on "floor time" and "bench time" was shortened. Breads, obtained by baking the doughs, exhibit no change of appearance, a large increase of bulk, and fluffy bulge, as well as a satisfactory color, sectional texture, and taste. Since the doughs comprise a prescribed amount of isomaltooligosaccharide and α,α-trehalose as less-fermentable saccharides, they can be made into breads with a less-stiffening property and no change of taste. Even in the case of freezing the doughs after "bench time", they after thawing show no differential fermentability in comparison with the case of the doughs not frozen.

Example 5

Premixed Flour for Producing Rice Flour Breads

One hundred parts by weight of a fine rice flour having a grain size of less than 75 μm, obtained by milling a white rice using a mill and sifting with a 200-mesh sifter, 15 parts by weight of "GLURICH A", a gluten commercialized by Chiba Seifun Co. Ltd., Chiba, Japan, two parts by weight of "TREHA®", a hydrous crystalline α,α-trehalose commercialized by Hayashibara Shoji Inc., Okayama, Japan, three parts by weight of "POWDERY MABIT", a maltitol product comprising maltitol of 93.5% or higher, commercialized by Hayashibara Shoji Inc., Okayama, Japan, eight parts by weight of "mijinko", a gelatinous rice starch, and one part by weight of "MOCHI SOFT", an enzyme for starch saccharification (135 units per one gram of gelatinous rice starch) commercialized by Sankyo Foods Co., Ltd., Tokyo, Japan, were mixed using a blender to produce a premixed flour for breadmaking.

The premixed flour has a satisfactory handleability and mechanical aptitude, and can be made into doughs having no adherability on the production of bread doughs. In comparison with the case of wheat flour, the doughs have substantially the same level of bulging and have a satisfactory working efficiency whereas the time for their fermentation on "floor time" and "bench time" was shortened. Breads, obtained by baking the doughs, exhibit no change of appearance, a large increase of bulk, and fluffy bulge, as well as a satisfactory color, sectional texture, and taste. The amount of less-fermentable saccharide comprised in the dough reached a prescribed amount by being admixed maltose which is produced from gelatinous rice starch by the action of the enzyme for starch saccharification in the course of fermenting in addition to maltose, maltitol, and α,α-trehalose as less-fermentable saccharides. Therefore, they can be made into breads with a less-stiffening property and no change of taste. Even in the case of freezing the doughs after "bench time", they after thawing show no differential fermentability in comparison with the case of the doughs not frozen.

Example 6

Premixed Flour for Producing Rice Flour Breads

One hundred parts by weight of a fine rice flour having a grain size of less than 75 μm, obtained by milling a white rice using a mill and sifting with a 200-mesh sifter, 15 parts by weight of "GLURICH A" a gluten commercialized by Chiba Seifun Co. Ltd., Chiba, Japan, five parts by weight of "TREHA®", a high purity hydrous crystalline α,α-trehalose (α,α-trehalose content of 98% or higher) commercialized by Hayashibara Shoji Inc., Okayama, Japan, five parts by weight of "kanbaiko", a gelatinous rice starch, and 0.5 part by weight of maltotetraose-forming amylase agent which is originally prepared using anhydrous α,α-trehalose as a powderizing base (2,000 units/g, 200 units per one gram of gelatinous rice starch) were mixed using a blender to produce a premixed flour for breadmaking.

The premixed flour has a satisfactory handleability and mechanical aptitude, and can be made into doughs having no adherability on the production of bread dough. In comparison with the case of wheat flour, the doughs have substantially the same level of bulging and have a satisfactory working efficiency whereas the time for their fermentation on "floor time" and "bench time" was shortened. Breads, obtained by baking the doughs, exhibit no change of appearance, a large increase of bulk, and fluffy bulge, as well as a satisfactory color, sectional texture, and taste. The amount of less-fermentable saccharides comprised in the dough reached prescribed amount by being added maltotetraose which is produced from gelatinous rice starch by the action of maltotetraose-forming amylase in the course of fermenting in addition to α,α-trehalose as less-fermentable saccharide. Therefore, they can be made into breads with a less-stiffening property and no change of taste. Even in the case of freezing the doughs after "bench time", they after thawing show no differential fermentability in comparison with the case of the doughs not frozen.

Example 7

Rice Flour Butter Rolls

One hundred and twenty-eight parts by weight of a premixed flour for producing rice flour breads, prepared by the method of Example 1, 10 parts by weight of sucrose, 1.7 parts by weight of sodium chloride, two parts by weight of a skim milk, two parts by weight of "KAIYO KOBO", a yeast commercialized by Sankyo Foods Co., Ltd., Tokyo, Japan, 12 parts by weight of whole egg, 10 parts by weight of a salt-free butter, 20 parts by weight of milk, and 65 parts by weight of water were kneaded at 24° C. for six minutes at a low speed and five minutes at a moderate speed using a kneader. After stopping the kneading for a while, the mixture was kneaded for 4.5 minutes at a moderate speed to make into doughs. Successively, the doughs were fermented for 50 minutes as "floor time". After dividing the dough into an aliquot of 40 grams each and the resultant doughs were rounded and fermented for 20 minutes as "bench time", the doughs were further fermented for 50 minutes using a proofing room controlled at 40° C. and a humidity of 80%. After the fermentation, the doughs were baked for seven minutes in an oven which the upper and lower temperatures were controlled to 230° C. and 200° C., respectively, to produce rice flour butter rolls.

The doughs prepared in the present example shows no adherability, and a satisfactory handleability and mechanical aptitude. In comparison with the case of wheat flour, the doughs have substantially the same level of bulging and have a satisfactory working efficiency whereas the time for their fermentation on "floor time" and "proofing time" was shortened. The butter rolls, obtained by baking the doughs, exhibit a large increase of bulk, fluffy bulge, satisfactory color, moderate sectional texture, and good taste. Furthermore, since the bread preserved in a refrigerator (5° C.) for a week shows almost no change of texture and no stiffening property, the bread was evaluated to have a satisfactory preservability.

Example 8

Rice Flour Open Top Breads

One hundred parts by weight of "KOMENO-KO (for bread)", a rice flour comprising gluten commercialized by Saito Seifun Inc., Niigata, Japan, used in Experiment 1, six parts by weight, d.s.b., of "SUNMALT S", a purified maltose (maltose content of 92% or higher) commercialized by Hayashibara Shoji Inc., Okayama, Japan, four parts by weight, d.s.b., of "Powdery MABIT", a maltitol product (maltitol content of 93.5% or higher) commercialized by Hayashibara Shoji Inc., Okayama, Japan, two parts by weight of "CELLOGEN", a carboxymethyl-cellulose sodium salt commercialized by Dai-ichi Kogyo Seiyaku Co., Ltd., Kyoto, Japan, three parts by weight of sucrose, two parts by weight of sodium chloride, 2.5 parts by weight of "KAIYO KOBO", a yeast commercialized by Sankyo Foods Co., Ltd., Tokyo, Japan, 10 parts by weight of a fresh cream, five parts by weight of a sugarless evaporated milk, four parts by weight of a shortening, and 80 parts by weight of water were kneaded at 23° C. for six minutes at a low speed and three minutes at a moderate speed using a kneader. After stopping the kneading for a while, the mixture was further kneaded for four minutes at a moderate speed to make into doughs. Successively, the doughs were fermented for 50 minutes as "floor time". After dividing the dough into a dividing specific volume of 3.5 (234 grams, four pieces) and the resultant doughs were rounded and fermented for 20 minutes as "bench time", the doughs were placed in tins having a height of 3.5 cm to shape into breads and further fermented for 50 minutes using a proofing room controlled at 40° C. and a humidity of 80%. After the fermentation, the doughs were baked for 45 minutes in an oven which the upper and lower temperatures were controlled to 230° C. and 200° C., respectively, to produce rice flour open top breads.

The doughs prepared in the present example show no adherability, and a satisfactory handleability and mechanical aptitude. In comparison with the case of wheat flour, the doughs have substantially the same level of bulging and have a satisfactory working efficiency whereas the time for their fermentation on "floor time" and "proofing time" was shortened. Breads, obtained by baking the doughs, shows a large increase of bulk, fluffy bulge, satisfactory color, moderate sectional texture, and good taste. Furthermore, since the breads preserved in a refrigerator (5° C.) for a week show almost no change of texture and no stiffening property, the breads were evaluated to have a satisfactory preservability.

Example 9

Rice Flour Open Top Breads

One hundred parts by weight of "KOMENO-KO (for bread)", a rice flour comprising gluten commercialized by Saito Seifun Inc., Niigata, Japan, used in Experiment 1, eight parts by weight, d.s.b., of "TREHA®", a high purity hydrous crystalline α,α-trehalose (α,α-trehalose content of 98% or higher) commercialized by Hayashibara Shoji Inc., Okayama, Japan, two parts by weight, d.s.b., of "Powdery MABIT", a maltitol product (maltitol content of 93.5% or higher) commercialized by Hayashibara Shoji Inc., Okayama, Japan, two parts by weight of "CELLOGEN", a carboxymethyl-cellulose sodium salt commercialized by Dai-ichi Kogyo Seiyaku Co., Ltd., Kyoto, Japan, three parts by weight of sucrose, two parts by weight of sodium chloride, 2.5 parts by weight of "KAIYO KOBO", a yeast commercialized by Sankyo Foods Co., Ltd., Tokyo, Japan, 10 parts by weight of a fresh cream, five parts by weight of a sugarless evaporated milk, four parts by weight of a shortening, and 80 parts by weight of water were kneaded at 23° C. for six minutes at a low speed and three minutes at a moderate speed using a kneader. After stopping the kneading for a while, the mixture was further kneaded for four minutes at a moderate speed to make into doughs. Successively, the doughs were fermented for 50 minutes as "floor time". After dividing the doughs with dividing specific volume of 3.5 (234 grams, four pieces) and the resultant doughs were rounded and fermented for 20 minutes as "bench time", the doughs were placed in tins having a height of 3.5 cm to shape into breads and further fermented for 50 minutes using a proofing room controlled at 40° C. and a humidity of 80%. After the fermentation, the doughs were baked for 45 minutes in an oven which the upper and lower temperatures were controlled to 230° C. and 200° C., respectively, to produce rice flour open top breads.

The doughs prepared in the present example show no adherability, and a satisfactory handleability and mechanical aptitude. In comparison with the case of wheat flour, the doughs have substantially the same level of bulging and have a satisfactory working efficiency whereas the time for their fermentation on "floor time" and "proofing time" was shortened. Breads, obtained by baking the doughs, show a large increase of bulk, fluffy bulge, satisfactory color, moderate sectional texture, and good taste. Furthermore, since the breads preserved in a refrigerator (5° C.) for a week show almost no change of texture and no stiffening property, the breads were evaluated to have a satisfactory preservability.

Example 10

Rice Flour Bread Rolls

One hundred and thirty-three parts by weight of a premixed flour prepared by the method of Example 2, three parts by weight of sucrose, two parts by weight of sodium chloride, 2.5 parts by weight of "KAIYO KOBO", a yeast commercialized by Sankyo Foods Co., Ltd., Tokyo, Japan, 10 parts by weight of a fresh cream, five parts by weight of a sugarless evaporated milk, four parts by weight of a shortening, and 95 parts by weight of water were kneaded at 23° C. for six minutes at a low speed and three minutes at a moderate speed using a kneader. After stopping the kneading for a while, the mixture was further kneaded for four minutes at a moderate speed to make into doughs. Successively, the doughs were fermented for 50 minutes of "floor time". After dividing, rounding, shaping to bread rolls, and fermenting for 20 minutes as "bench time", the doughs were further fermented for 50 minutes using a proofing room controlled at 40° C. and a humidity of 80%. After the fermentation, the doughs were baked for 45 minutes in an oven which the upper and lower temperatures were controlled to 230° C. and 200° C., respectively, to produce bread rolls.

The doughs prepared in the present example show no adherability, and a satisfactory handleability and mechanical aptitude. In comparison with the case of wheat flour, the doughs have substantially the same level of bulging and have a satisfactory working efficiency whereas the time for their fermentation on "floor time" and "proofing time" was shortened. Bread rolls, obtained by baking the doughs, show a large increase of bulk, fluffy bulge, satisfactory color, moderate sectional texture, and good taste. Furthermore, since the breads preserved in a refrigerator (5° C.) for a week show almost no change of texture and no stiffening property, the breads were evaluated to have a satisfactory preservability.

Example 11

Rice Flour Loafs

One hundred parts by weight of "KOMENO-KO (for bread)", a rice flour comprising gluten commercialized by Saito Seifun Inc., Niigata, Japan, used in Experiment 1, nine parts by weight of "SUNMALT", a maltose product (maltose content of 87% or higher) commercialized by Hayashibara Shoji Inc., Okayama, Japan, six parts by weight, d.s.b., of "PALATINIT", a reduced palatinose commercialized by Shin Mitsui Sugar Co., Ltd., Tokyo, Japan, 18 parts by weight of sucrose, one part by weight of sodium chloride, three parts by weight of a skim milk, 3.5 parts by weight of "KAIYO KOBO", a yeast commercialized by Sankyo Foods Co., Ltd., Tokyo, Japan, five parts by weight of whole egg, 10 parts by weight of a salt-free margarine, seven parts by weight of a koji-leaven, and 85 parts by weight of water were kneaded at 23° C. for five minutes at a low speed and five minutes at a moderate speed using a kneader. After stopping the kneading for a while, the mixture was further kneaded for two minutes at a moderate speed to make into doughs. Successively, the doughs were fermented for 50 minutes as "floor time". After dividing the dough into a aliquot of 40 grams each and the resultant doughs were rounded and fermented for 20 minutes as "bench time", the doughs were shaped and further fermented for 50 minutes using a proofing room controlled at 40° C. and a humidity of 80%. After the fermentation, the doughs were baked for eight minutes in an oven which the upper and lower temperatures were controlled to 220° C. and 200° C., respectively, to produce rice flour loafs.

The doughs prepared in the present example show no adherability, and a satisfactory handleability and mechanical aptitude. In comparison with the case of wheat flour, the doughs have substantially the same level of bulging and have a satisfactory working efficiency whereas the time for their fermentation on "floor time" and "proofing time" was shortened. Loafs, obtained by baking the doughs, show a large increase of bulk, fluffy bulge, satisfactory color, moderate sectional texture, and good taste. Furthermore, since the breads preserved in a refrigerator (5° C.) for a week show almost no change of texture and no stiffening property, the breads were evaluated to have a satisfactory preservability.

Example 12

Rice Flour "Ann (Sweetened Bean Paste)" Buns

One hundred and twenty-nine parts by weight of a premixed flour prepared by the method of Example 5, 18 parts by weight of sucrose, one part by weight of sodium chloride, three parts by weight of a skim milk, 3.5 parts by weight of "KAIYO KOBO", a yeast commercialized by Sankyo Foods Co., Ltd., Tokyo, Japan, five parts by weight of whole egg, 10 parts by weight of a salt-free margarine, seven parts by weight of a koji-leaven, and 87 parts by weight of water were kneaded at 23° C. for five minutes at a low speed and five minutes at a moderate speed using a kneader. After stopping the kneading for a while, the mixture was further kneaded for two minutes at a moderate speed to make into doughs. Successively, the doughs were fermented for 50 minutes of "floor time". After dividing the dough into an aliquot of 40 grams each, rounding the resultant doughs, and fermenting for 20 minutes as "bench time", "ann (sweetened bean paste)" was put into the doughs, and the resultant doughs were shaped and further fermented for 50 minutes using a proofing room controlled at 40° C. and a humidity of 80%. After the fermentation, the doughs were baked for 45 minutes in an oven which the upper and lower temperature were controlled to 220° C. and 200° C., respectively, to produce a rice flour "ann (sweetened bean paste)" buns.

The doughs prepared in the present example show no adherability, and a satisfactory handleability and mechanical aptitude. In comparison with the case of wheat flour, the doughs have substantially the same level of bulging and have a satisfactory working efficiency whereas the time for their fermentation on "floor time" and "proofing time" was shortened. The "ann (sweetened bean paste)" buns, obtained by baking the doughs, show a large increase of bulk, fluffy bulge, satisfactory color, moderate sectional texture, and good taste. Furthermore, since the buns preserved in a refrigerator (5° C.) for a week show almost no change of texture and no stiffening property, the buns were evaluated to have a satisfactory preservability.

Example 13

Rice Flour Crescent Rolls (Croissants)

One hundred parts by weight of "KOMENO-KO (for bread)", a rice flour comprising gluten commercialized by Saito Seifun Inc., Niigata, Japan, used in Experiment 1, six parts by weight, d.s.b., of "PALATINOSE", a high purity palatinose commercialized by Shin Mitsui Sugar Co., Ltd., Tokyo, Japan, four parts by weight, d.s.b., of "HS-30", a reduced syrup (containing 5.7% of sorbitol, 17.1% of maltitol, 16.4% of maltotritol, and 7.9% of maltotetraitol) commercialized by Hayashibara Shoji Inc., Okayama, Japan, three parts by weight of "SUNDEX", a dextrin (DE 18) commercialized by Sanwa Cornstarch Co., Ltd., Nara, Japan, 12 parts by weight of sucrose, 1.7 parts by weight of sodium chloride, two parts by weight of a skim milk, 3.5 parts by weight of "KAIYO KOBO", a yeast commercialized by Sankyo Foods Co., Ltd., Tokyo, Japan, 18 parts by weight of whole egg, 15 parts by weight of a salt-free butter, 20 parts by weight of milk, and 52 parts by weight of water were kneaded at 21° C. for four minutes at a low speed using a kneader. Successively, the doughs were fermented for 50 minutes as "floor time". After dividing the dough into an aliquot of 1,800 grams each, the doughs were further divided into an aliquot of 500 grams each, made into sheets, and then kept at −10° C. for 30 minutes. The sheets were bent triple twice, further kept at −10° C. for 20 minutes, and then bent triple once. After expanding the doughs to thickness of 3 mm and shaping to narrow triangle by cutting, the resultant doughs were fermented for 50 minutes using a proofing room controlled at 30° C. and a humidity of 75%. After the fermentation, the doughs were baked for 13 minutes in an oven which the upper and lower temperatures were controlled to 230° C. and 200° C., respectively, to produce a rice flour crescent rolls (croissants), a kind of rice flour Danish pastry.

The doughs for crescent rolls (croissants), prepared in the present example, show no adherability, and a satisfactory handleability and mechanical aptitude. In comparison with the case of wheat flour, the doughs have substantially the same level of bulging and have a satisfactory working efficiency whereas the time for their fermentation on "floor time" and "proofing time" was shortened. The crescent rolls (croissants), obtained by baking the doughs, show a large increase of bulk, fluffy bulge, satisfactory color, moderate sectional texture, and good taste. Furthermore, since the rice flour crescent rolls (croissants) preserved in a refrigerator (5° C.) for a week show almost no change of texture and no stiffening property, the crescent rolls (croissants) were evaluated to have a satisfactory preservability.

Example 14

Rice Flour Meat Chinese Steamed Breads

One hundred and thirty parts by weight of a premixed flour prepared by the method of Example 3, five parts by weight of sucrose, two parts by weight of "KAIYO KOBO", a yeast commercialized by Sankyo Foods Co., Ltd., Tokyo, Japan, two parts by weight of a skim milk, two parts by weight of a lard, 1.5 parts by weight of a baking powder for steaming, and 91 parts by weight of water were kneaded at 24° C. for six minutes at a low speed and three minutes at a moderate speed using a kneader. Successively, the doughs were fermented for 50 minutes as "floor time". After dividing the dough into an aliquot of 50 grams each and putting cooked ingredient into the doughs, the resultant doughs were shaped and further fermented for 40 minutes at room temperature. After the fermentation, the doughs were steamed for 10 minutes over high flame in a steamer to produce rice flour meat Chinese steamed breads.

In comparison with the case of wheat flour, the doughs have substantially the same level of the time for fermenting and bulging, and have a satisfactory working efficiency. The rice flour meat Chinese steamed breads, obtained by steaming the doughs, show a large increase of bulk, fluffy bulge, satisfactory color, moderate sectional texture, and good taste. Furthermore, since the steamed breads preserved in a refrigerator (5° C.) for four days show almost no change of texture and no stiffening property, the breads were evaluated to have a satisfactory preservability. In addition, in the case of steaming a shaped doughs frozen (−10° C.) for a week, the steamed breads show satisfactory qualities and no difference with that which is not frozen.

INDUSTRIAL APPLICABILITY

As is evident from the above, according to the present invention, bakery products having satisfactory qualities (appearance, crumb, taste, preservability, etc.) can be produced using rice flour as material.

Therefore, the establishment of the present invention enables to provide a novel process for producing various bakery products, for example, bread, bread roll, loaf, French bread, German bread, raisin bread, bagel, Danish pastry, pretzel, pie, scone, steamed cake, Chinese steamed bread, yeast raised doughnut, pizza, nan bread, etc., using rice flour, which has not been used practically in spite of various past studies, as a major material. Also, the present invention enables easy to provide high quality bakery products having a satisfactory appearance, crumb, taste, preservability, etc. The present invention activates rice-polishing industry, flour milling industry, bakery industry, feeding industry, catering industry, frozen-food industry, and food distribution industry such as convenient store and supermarket. Furthermore, the present invention makes a large contribution to rising of rice consumption and to improving Japan's self-sufficient ratio.

The invention claimed is:

1. A process for producing bakery products, which comprises of:
    (a) kneading a dough comprising flour consisting of rice flour sucrose, gluten, bakery yeast, water and one or more saccharides selected from the group consisting of α,α-trehalose, maltose, maltitol, isomaltose, isomaltotriose, panose, sorbitol, maltotriitol, palatinose, reduced palatinose, maltotriose, maltotetraose, maltopentaose and maltohexaose, said saccharides present in an amount of from 6 w/w % to 20 w/w % of said rice flour, on a dry solid basis; and
    (b) fermenting said dough to produce a fermented dough;
    (c) heating said fermented dough to produce bakery products.

2. The process of claim 1, wherein said dough is produced by adding water to said rice flour in an amount of from 85 w/w % to 115 w/w % of said rice flour.

3. The process of claim 1, wherein said saccharide comprises α,α-trehalose in an amount of less than 6 w/w % of said rice flour, on a dry solid basis, and one or more other saccharides selected from the group consisting of maltose, maltitol, isomaltose, isomaltotriose, panose, sorbitol, maltotriitol, palatinose, reduced palatinose, maltotriose, maltotetraose, maltopentaose and maltohexaose.

4. The process of claim 1, wherein said dough for fermentation is prepared by incorporating carboxymethylcellulose or pullulan into said rice flour in an amount of from 0.5 w/w % to 5 w/w %, on a dry solid basis.

5. The process of claim 1, wherein said fermented dough is heated by baking, frying, steaming, or microwave.

6. A bakery product which is produced by the process of claim 1.

7. The bakery product of claim 6, wherein said bakery product is a full-size loaf of bread, bread roll, loaf, French bread, German bread, raisin bread, bagel, Danish pastry, or pretzel, pie, scone, steamed cake, Chinese steamed bread, yeast raised doughnut, pizza, or nan bread.

8. A fermented dough for producing bakery products in accordance with the process of claim 1, comprising flour consisting of rice flour, gluten, sucrose and one or more saccharides selected from the group consisting of α,α-trehalose, maltose, maltitol, isomaltose, isomaltotriose, panose, sorbitol, maltotriitol, palatinose, reduced palatinose, maltotriose, maltotetraose, maltopentaose and maltohexaose said saccharides present in an amount of from 6 w/w % to 20 w/w % of said rice flour, on a dry solid basis.

* * * * *

UNITED STATES PATENT AND TRADEMARK OFFICE
CERTIFICATE OF CORRECTION

| | |
|---|---|
| PATENT NO. | : 7,815,952 B2 |
| APPLICATION NO. | : 10/502600 |
| DATED | : October 19, 2010 |
| INVENTOR(S) | : Susumu Inoue et al. |

Page 1 of 1

It is certified that error appears in the above-identified patent and that said Letters Patent is hereby corrected as shown below:

At claim 1, column 36, lines 4-5, insert --,-- between the words "rice flour" and "sucrose"

Signed and Sealed this
Twenty-eighth Day of June, 2011

David J. Kappos
*Director of the United States Patent and Trademark Office*